United States Patent
Ge et al.

(10) Patent No.: US 10,834,633 B2
(45) Date of Patent: Nov. 10, 2020

(54) TRANSPORT BLOCK GENERATION METHOD AND APPARATUS

(71) Applicant: Huawei Technologies Co., Ltd., Shenzhen, Guangdong (CN)

(72) Inventors: Shibin Ge, Shanghai (CN); Xiaoyan Bi, Shanghai (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 16/169,849

(22) Filed: Oct. 24, 2018

(65) Prior Publication Data

US 2019/0059020 A1 Feb. 21, 2019

Related U.S. Application Data

(63) Continuation of application No. PCT/CN2017/078186, filed on Mar. 24, 2017.

(30) Foreign Application Priority Data

Apr. 25, 2016 (CN) .......................... 2016 1 0262568

(51) Int. Cl.
*H04W 4/00* (2018.01)
*H04W 28/06* (2009.01)
(Continued)

(52) U.S. Cl.
CPC ............... *H04W 28/06* (2013.01); *H04L 1/00* (2013.01); *H04L 1/0007* (2013.01);
(Continued)

(58) Field of Classification Search
None
See application file for complete search history.

(56) References Cited

U.S. PATENT DOCUMENTS

| | | | |
|---|---|---|---|
| 2009/0185638 A1* | 7/2009 | Imamura | H04L 1/0025 375/298 |
| 2015/0063280 A1* | 3/2015 | Nan | H04L 1/0006 370/329 |

(Continued)

FOREIGN PATENT DOCUMENTS

| | | |
|---|---|---|
| CN | 103795509 A | 5/2014 |
| CN | 104038970 A | 9/2014 |
| WO | 2011/111961 A2 | 9/2011 |

OTHER PUBLICATIONS

Office Action issued in Chinese Application No. 201610262568.X dated Apr. 30, 2019, 11 pages (with English translation).
Huawei, HiSilicon, "TBS determination for short TTI", 3GPP TSG RAN WG1 Meeting #87, Reno, USA Nov. 14-18, 2016, 4 pages, R1-1611877.

(Continued)

*Primary Examiner* — Clemence S Han
(74) *Attorney, Agent, or Firm* — Fish & Richardson P.C.

(57) ABSTRACT

This application relates to the field of communications technologies, and discloses a transport block generation method and apparatus. The method includes: determining a TBS based on an MCS of a receiving device, a resource characteristic of an RB allocated to the receiving device, and a quantity of symbols, where the quantity of symbols is a quantity of symbols included in each RB, and each RB includes a same quantity of symbols; and generating a TB based on a TBS. TBS is determined based on the MCS of the receiving device, a quantity of RBs allocated to the receiving device, and the quantity of symbols included in the RB, and the TB is generated based on the determined TBS. The quantity of symbols included in the RB is considered in determining the TBS. Therefore, the determined TBS may vary with the quantity of symbols included in the RB.

16 Claims, 25 Drawing Sheets

(51) Int. Cl.
*H04L 1/00* (2006.01)
*H04L 5/00* (2006.01)
*H04W 28/18* (2009.01)
*H04W 72/04* (2009.01)

(52) U.S. Cl.
CPC .......... *H04L 5/0044* (2013.01); *H04W 28/18* (2013.01); *H04L 5/003* (2013.01); *H04L 5/0053* (2013.01); *H04W 72/044* (2013.01)

(56) References Cited

U.S. PATENT DOCUMENTS

| | | | |
|---|---|---|---|
| 2015/0085767 A1* | 3/2015 | Einhaus | H04L 1/0001 370/329 |
| 2015/0195819 A1* | 7/2015 | Kwon | H04L 1/0016 370/329 |
| 2015/0237644 A1* | 8/2015 | Golitschek Edler von Elbwart | H04B 7/2656 370/329 |
| 2015/0305059 A1 | 10/2015 | *Li et al. | |
| 2018/0054757 A1* | 2/2018 | Nanri | H04W 28/06 |
| 2018/0115962 A1* | 4/2018 | Kim | H04W 72/04 |
| 2020/0008193 A1* | 1/2020 | Yeo | H04L 5/0055 |

OTHER PUBLICATIONS

KT Corp., "Views on TBS determination for Rel-13 MTC", 3GPP TSG RAN WG1 Meeting #82bis, Malmö, Sweden, Oct. 5-9, 2015, 3 pages, R1-156028.

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0 (Mar. 2016), 155 pages.

3rd Generation Partnership Project; Technical Specification Group Radio Access Network; Evolved Universal Terrestrial Radio Access (E-UTRA); Physical layer procedure (Release 13), 3GPP TS 36.213 V13.1.0 (Mar. 2016), 371 pages.

Ericsson, "Physical layer aspects of short TTI for uplink transmissions", 3GPP TSG RAN WG1 Meeting #84 Malta, Feb. 15-19, 2016, 4 pages, R1-160939.

LG Electronics, "System-level simulation results for latency reduction", 3GPP TSG RAN WG1 #84 Meeting, St Julian's, Malta, Feb. 15-19, 2016, 10 pages, R1-160648.

3rd Generation Partnership Project; Technical Specification Group Radio Access Network; Evolved Universal Terrestrial Radio Access (E-UTRA); Physical layer procedures (Release 10), 3GPP TS 36.213 V10.13.0 (Jun. 2015), 128 pages.

* cited by examiner

TRANSPORT BLOCK GENERATION METHOD AND APPARATUS

CROSS-REFERENCE TO RELATED APPLICATIONS

This application is a continuation of International Application No. PCT/CN2017/078186 filed on Mar. 24, 2017, which claims priority to Chinese Patent Application No. 201610262568.X filed on Apr. 25, 2016. The disclosures of the aforementioned applications are hereby incorporated by reference in their entireties.

TECHNICAL FIELD

This application relates to the field of communications technologies, and in particular, to a transport block generation method and apparatus.

BACKGROUND

A transport block (TB) is a basic unit for exchanging data between a physical layer and a Media Access Control (MAC) layer. A transport block size (TBS) depends on a modulation and coding scheme (MCS) and a size of a time-frequency resource allocated to a terminal.

A base station usually allocates the time-frequency resource to the terminal in a unit of a resource block (RB) pair according to an existing Long Term Evolution (LTE) standard. FIG. 1 is a schematic diagram of a logical structure of an existing resource block pair 100. The resource block pair 100 is located in a subframe (not shown), and in addition to the resource block pair 100 shown in FIG. 1, the subframe further includes another resource block pair (not shown). As shown in FIG. 1, the resource block pair 100 includes a resource block 102 and a resource block 104. The resource block 102 and the resource block 104 are carried by a same group of consecutive subcarriers in frequency domain, and the group of subcarriers includes 12 subcarriers. In addition, the resource block 102 and the resource block 104 belong to different timeslots (Slot). For example, the resource block 102 belongs to a timeslot 0, and the resource block 104 belongs to a timeslot 1. When a regular cyclic prefix (CP) is used, each timeslot includes seven symbols in time domain, as shown in FIG. 1. When an extended cyclic prefix is used, each timeslot includes six symbols (not shown) in time domain. In addition, a minimum resource unit in the resource block pair 100 is a resource element (RE), for example, a resource element 106. Each resource element is carried by one subcarrier in frequency domain and one symbol in time domain. Therefore, when the regular cyclic prefix is used, the resource block 102 and the resource block 104 each include 84 (12×7) resource elements, and the resource block pair 100 includes 168 resource elements. When the extended cyclic prefix is used, the resource block 102 and the resource block 104 each include 72 (12×6) resource elements, and the resource block pair 100 includes 144 resource elements. Sometimes, the resource block is also referred to as a physical resource block (PRB).

In the existing LTE standard, the TBS is determined by using the following method: determining an MCS that is used by data carried on the time-frequency resource allocated to the terminal; obtaining, from a correspondence table of an MCS index value and a TBS index value, a TBS index value corresponding to an MCS index value of the determined MCS; obtaining a quantity of PRBs allocated to the terminal; and searching a correspondence table of a TBS index value, a quantity of PRBs, and a TBS for the TBS corresponding to the obtained TBS index value and the quantity of PRBs.

Based on the existing LTE standard, after a used cyclic prefix type (the regular cyclic prefix or the extended cyclic prefix) is determined, a quantity of symbols included in a PRB is fixed (seven symbols or six symbols are included). However, to meet a requirement of a new service scenario, in a future new cellular communications standard, the quantity of symbols included in the PRB may not be fixed, but may often change based on a requirement (for example, a service type). In this way, an existing manner of determining the TBS is no longer applicable.

SUMMARY

To resolve a prior-art problem that a TBS cannot be determined when a quantity of symbols included in a PRB is changeable, embodiments of the present disclosure provide a transport block generation method and apparatus. The technical solutions are as follows:

According to a first aspect, an embodiment of the present disclosure provides a transport block generation method. The method includes:

determining a transport block TB size TBS based on a modulation and coding scheme MCS of a receiving device, a resource characteristic of a resource block RB allocated to the receiving device, and a quantity of symbols, where the quantity of symbols is a quantity of symbols included in each RB, and each RB includes a same quantity of symbols; and generating a TB based on the TBS.

The TBS is determined based on the MCS of the receiving device, the resource characteristic of the RB allocated to the receiving device, and the quantity of symbols included in the RB, and the TB is generated based on the determined TBS. The quantity of symbols included in the RB is considered in a process of determining the TBS. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

Optionally, the determining a TBS based on an MCS of a receiving device, a resource characteristic of an RB allocated to the receiving device, and a quantity of symbols specifically includes:

determining a TBS index value based on the MCS; and
determining the TBS based on the TBS index value, the resource characteristic of the RB, and the quantity of symbols.

With reference to an existing method for determining a TBS, the TBS index value is first determined based on the MCS, and then the TBS is determined based on the TBS index value. A relatively small change is made to the prior art, and compatibility is better.

Optionally, the resource characteristic of the RB is a quantity of RBs.

Optionally, the resource characteristic of the RB is a quantity of equivalent RBs, the quantity of equivalent RBs is associated with resource utilization of the RB, and the resource utilization of the RB is a ratio of a quantity of resource elements REs occupied by data in the RB to a quantity of REs occupied by the RB.

An adaptive adjustment is made for a change in the resource utilization of the RB.

Optionally, the determining the TBS based on the TBS index value, the resource characteristic of the RB, and the quantity of symbols specifically includes:

determining the quantity of equivalent RBs based on a ratio of a size of data transmitted by each RB in a resource mapping mode to a size of data transmitted in a resource mapping mode that is used as a reference; and determining the TBS based on the TBS index value, the quantity of equivalent RBs, and the quantity of symbols.

Optionally, the determining the TBS based on the TBS index value, the resource characteristic of the RB, and the quantity of symbols specifically includes:

determining the quantity of equivalent RBs based on a ratio of a size of data transmitted by all RBs in resource mapping modes to a size of data transmitted in a resource mapping mode that is used as a reference; and determining the TBS based on the TBS index value, the quantity of equivalent RBs, and the quantity of symbols.

Two manners of determining the quantity of equivalent RBs are provided, and a implementation may be selected based on an actual situation.

Optionally, the resource characteristic of the RB is a product of a quantity of RBs and a quantity of layers of spatial multiplexing.

Optionally, the determining the TBS based on the TBS index value, the resource characteristic of the RB, and the quantity of symbols specifically includes:

determining whether the quantity of RBs is greater than an RB threshold; and when the quantity of RBs is less than or equal to the RB threshold, determining the TBS based on the TBS index value, the product of the quantity of RBs and the quantity of layers of spatial multiplexing, and the quantity of symbols; or when the quantity of RBs is greater than the RB threshold, determining a TBS of a first layer based on the TBS index value, the resource characteristic of the RB, and the quantity of symbols, and determining the TBS based on the quantity of layers of spatial multiplexing and the TBS of the first layer.

Considering impact of a spatial multiplexing technology on the TBS, the TBS is determined by using different methods based on a magnitude relationship between a size of a resource allocated to the receiving device and a size of a time-frequency resource that can be scheduled by a base station, resolving a problem that a TBS correspondence table cannot be directly used when the size of the resource allocated by the base station to the receiving device exceeds the size of the time-frequency resource that can be scheduled by the base station.

According to a second aspect, an embodiment of the present disclosure provides a transport block generation apparatus. The apparatus includes units such as a determining unit and a generation unit that are configured to implement the method according to the first aspect.

According to a third aspect, an embodiment of the present disclosure further provides a transport block generation apparatus. The apparatus includes a memory and a processor connected to the memory. The memory is configured to store a software program and a module. When running or executing the software program and the module that are stored in the memory, the processor may perform the method according to the first aspect.

According to a fourth aspect, an embodiment of the present disclosure further provides a computer readable medium, configured to store program code for execution by a terminal. The program code includes an instruction for performing the method according to the first aspect.

The technical solutions provided in the embodiments of the present disclosure have the following beneficial effects:

The TBS is determined based on the MCS of the receiving device, the quantity of RBs allocated to the receiving device, and the quantity of symbols included in the RB, and the TB is generated based on the determined TBS. The quantity of symbols included in the RB is considered in a process of determining the TBS. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

DETAILED DESCRIPTION

To make the objectives, technical solutions, and advantages of this application clearer, the following further describes the implementations of this application in detail with reference to the accompanying drawings.

A "module" described in this specification is a program or an instruction that is stored in a memory and that can implement some functions. A "unit" described in this specification is a functional structure obtained through logical division. The "unit" may be implemented by only hardware, or implemented by a combination of software and hardware.

Figure 1:
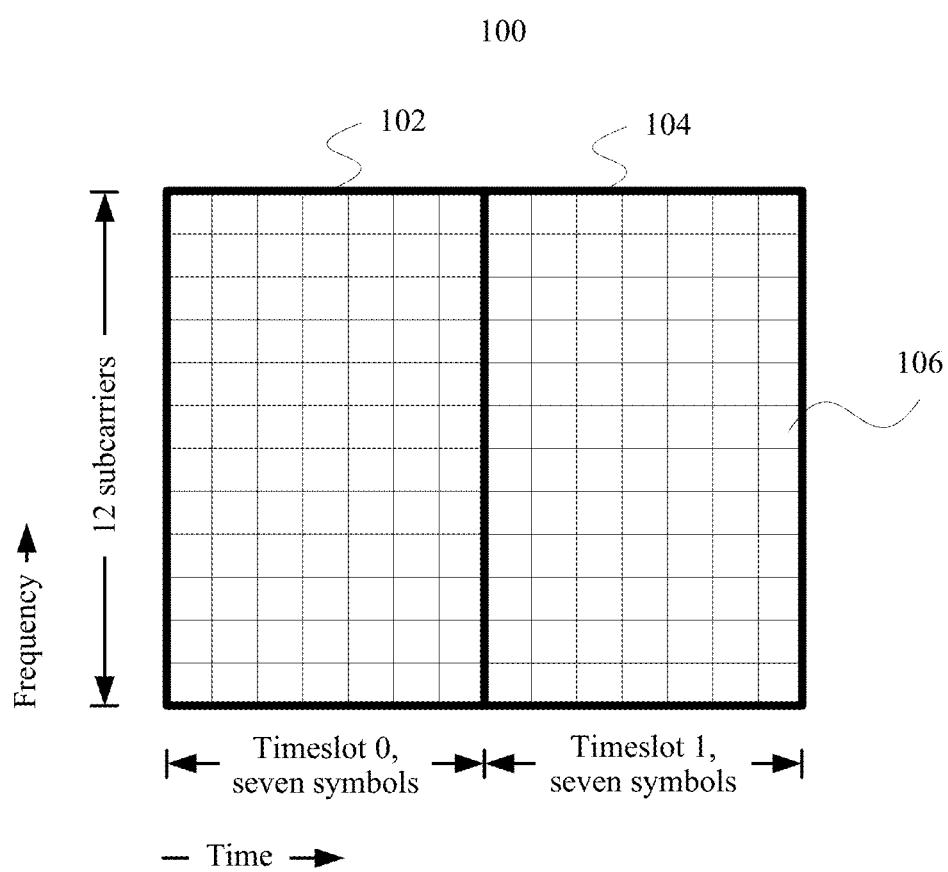
FIG. 1 is a schematic structural diagram of a resource block pair according to an embodiment of the present disclosure.
Figure 2:
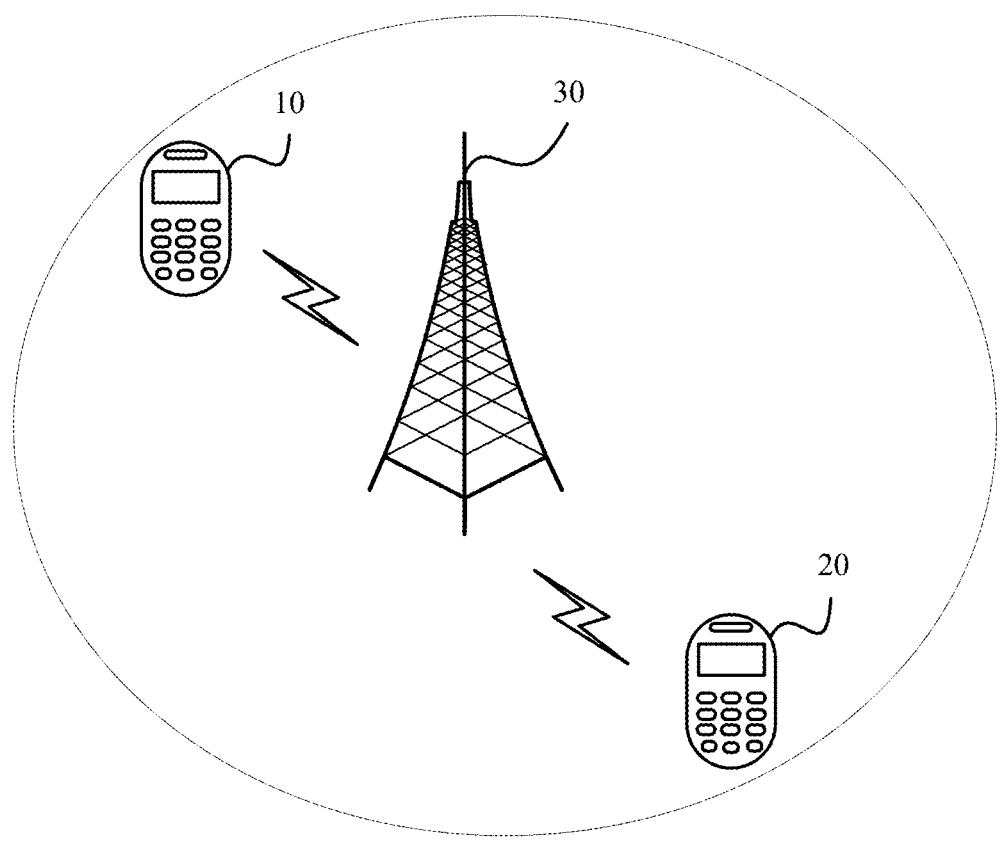
FIG. 2 is a diagram of an application scenario of a TB generation method according to an embodiment of the present disclosure.

The following first briefly describes, with reference to FIG. 2, an application scenario of a TB generation method provided in an embodiment of the present disclosure. As shown in FIG. 2, a terminal 10 and a terminal 20 are located in a serving area (an ellipse area shown in FIG. 2) of a base station 30, and the base station 30 separately allocates time-frequency resources to the terminal 10 and the terminal 20. A time-frequency resource allocated by the base station 30 to the terminal 10 is used to carry data transmitted by the base station 30 to the terminal 10, and a time-frequency resource allocated by the base station 30 to the terminal 20 is used to carry data transmitted by the base station 30 to the terminal 20. It should be noted that a quantity of terminals in FIG. 2 is merely an example, and the quantity of terminals for which the base station provides a communications service is determined based on an actual situation.

Figure 3:
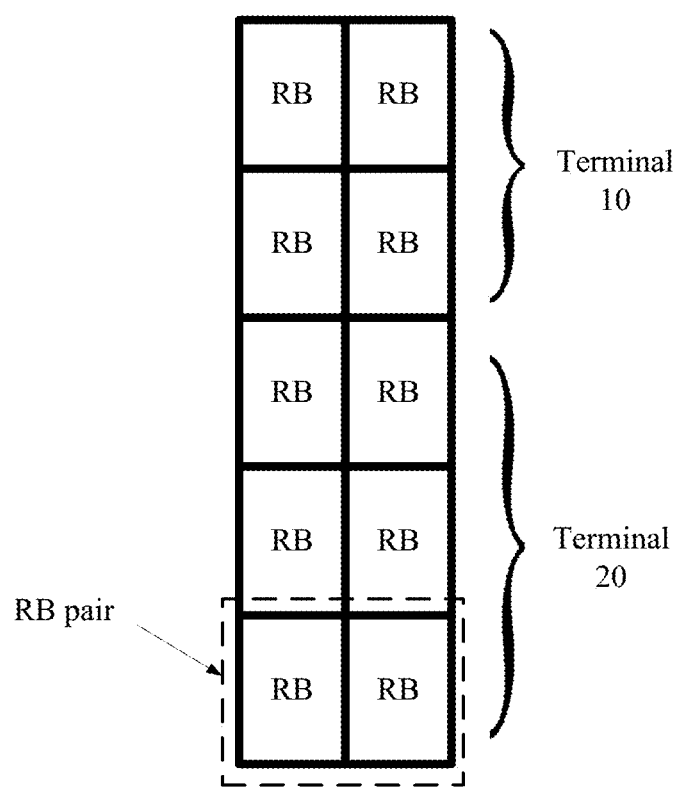
FIG. 3 is a schematic structural diagram of a time-frequency resource allocated to a terminal according to an embodiment of the present disclosure.

Specifically, referring to FIG. 3, in a subframe, the time-frequency resource allocated by the base station 30 to the terminal 10 includes two consecutive RB pairs in frequency domain, and the time-frequency resource allocated by the base station 30 to the terminal 20 includes three consecutive RBs pairs in frequency domain.

The RB in this application may be similar to an RB in an existing LTE standard, and a difference lies in that a same quantity of symbols are included in all RBs in a same scheduling interval, but different quantities of symbols may be included in RBs in different scheduling intervals. The scheduling interval herein may be a timeslot, a subframe, or a time interval whose length is another value. A specific length may be set based on a requirement. For example, if the scheduling interval is a timeslot, a same quantity of symbols are included in all RBs in a timeslot A, but a quantity of symbols included in an RB in the timeslot A is different from a quantity of symbols included in an RB in a timeslot B. The difference is also applicable to frequency domain. To be specific, a same quantity of subcarriers are included in all RBs in a same scheduling interval, but different quantities of subcarriers may be included in RBs in different scheduling intervals. Simply, in this application, a resource block in the LTE standard may be simplified as a resource unit in a single form. The resource unit is carried by a group of consecutive or inconsecutive subcarriers and is carried on a group of consecutive or inconsecutive symbols. Different quantities of symbols may be included in resource units in different scheduling intervals, and different quantities of subcarriers may be included in resource units in different scheduling intervals. For ease of description, the following still describes the technical solutions of this application by using an RB as an example. However, a person skilled in the art should understand that the RB may be understood as the resource unit.

The fifth generation mobile communication technology (5G) supports three application scenarios: enhanced mobile broadband (eMBB), massive machine type communication (mMTC), and ultra-reliable and low latency communications (UR/LI). The eMBB is characterized by a high throughput, and to reduce overheads caused by control signaling and a hybrid automatic repeat request (HARD), a relatively long transmission time interval (TTI) needs to be used. The mMTC supports high-density connections and generally uses small-packet transmission, and a relatively short TTI is applicable. The UR/LI requires a low delay, and a relatively short TTI needs to be used. In this way, for different scenarios, a 5G system supports scheduling intervals of different lengths.

Based on the characteristics of the 5G system, an embodiment of the present disclosure provides a technology in which a TBS is determined based on an MCS, a quantity of symbols, and a quantity of RBs and a TB is generated based on the determined TBS. The technology may be applied to a system in which a quantity of symbols included in an RB is changeable, such as the 5G system, and may also be applied to a system in which a quantity of symbols included in an RB remains unchanged, such as an LTE system. The MCS is an MCS in a scheduling interval, and the RB is an RB that is in the scheduling interval and that is allocated to, such as a terminal. As described above, in this application, a same quantity of symbols are included in all RBs in a scheduling interval. Therefore, the quantity of symbols considered when determining the TBS is a quantity of symbols included in each RB in the scheduling interval.

The following describes, with reference to a specific hardware structure, a base station that implements a TB generation method according to an embodiment of the present disclosure.

Figure 4:
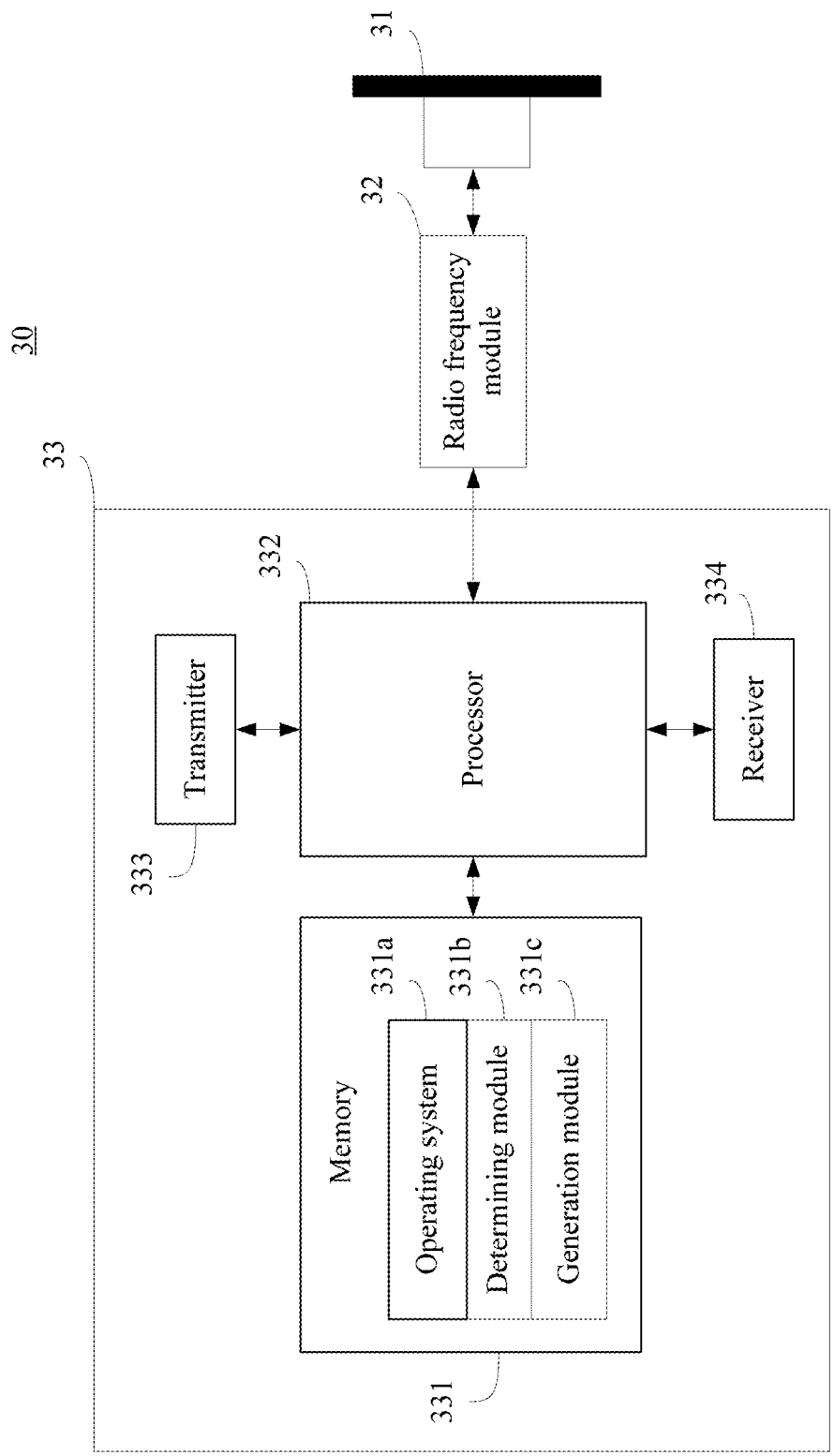
FIG. 4 is a structural diagram of hardware of a base station that implements a TB generation method according to an embodiment of the present disclosure.

FIG. 4 shows a structure of a base station that implements a TB generation method according to an embodiment of the present disclosure. The base station 30 includes: a plurality of antennas 31, a radio frequency module 32 (a radio remote unit (RRU) or a radio frequency unit (RFU)), and a baseband unit (BBU) 33. The baseband unit 33 includes: a memory 331, a processor 332, a transmitter 333, and a receiver 334. It should be noted that the structure of the base station 30 shown in FIG. 4 does not constitute a limitation on the base station 30. In actual application, the base station 30 may include more or fewer components than those shown in the figure, or combine some components, or have different component arrangements.

The processor 332 is a control center of the base station 30, connects various parts of the base station 30 by using various interfaces and lines, and executes various functions of the base station 30 and data processing by running or executing a software program and/or a module that are/is stored in the memory 331 and by invoking data stored in the memory 331, to perform overall control on the base station 30. Optionally, the processor 332 may include one or more processing cores.

The memory 331 may be configured to: store various types of data such as various configuration parameters, and store a software program and a module. The processor 332 runs the software program and the module that are stored in the memory 331, to execute various function applications and process data. The memory 331 may mainly include a program storage area and a data storage area. The program storage area may store an operating system 331a, a determining module 331b, a generation module 331c, and the like. The data storage area may store data created based on use of the base station 30, for example, a TBS index value. In addition, the memory 331 may be implemented by any type of volatile or non-volatile storage device or by a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc. Correspondingly, the memory 331 may further include a memory controller, to provide the processor 332 with access to the memory 331.

The BBU 33 is connected to the radio frequency module 32, and the radio frequency module 32 is connected to the antenna 31 by using a cable. In a downlink direction, the BBU 33 outputs a baseband signal to the radio frequency module 32. The radio frequency module 32 converts the baseband signal into an intermediate frequency signal, converts the intermediate frequency signal into a radio frequency signal, then amplifies the radio frequency signal by using a power amplification unit (for example, a radio frequency power amplifier), and finally transmits the amplified radio frequency signal by using the antenna 31. In an uplink direction, a radio frequency signal from a terminal is transferred to the radio frequency module 32 by using the antenna 31. The radio frequency module 32 first amplifies the radio frequency signal, converts the radio frequency signal into an intermediate frequency signal, then converts the intermediate frequency signal into a baseband signal, and finally outputs the baseband signal to the BBU 33.

In addition, the plurality of antennas 31 may implement MIMO spatial multiplexing. By adjusting angles of the plurality of antennas 31, different pieces of data are transmitted by using a same time-frequency resource at different layers divided in space, so as to fully use space resources to increase a system capacity.

The following describes the technical solutions in the embodiments provided in this application. It should be noted that unless otherwise specified, the technical solutions described below should be understood as a TB generation method in a scheduling interval. In a scheduling interval, an MCS remains unchanged, and a same quantity of symbols are included in all RBs. Therefore, a quantity of symbols considered when determining a TBS is a quantity of symbols included in each RB in a scheduling interval.

Figure 5A:
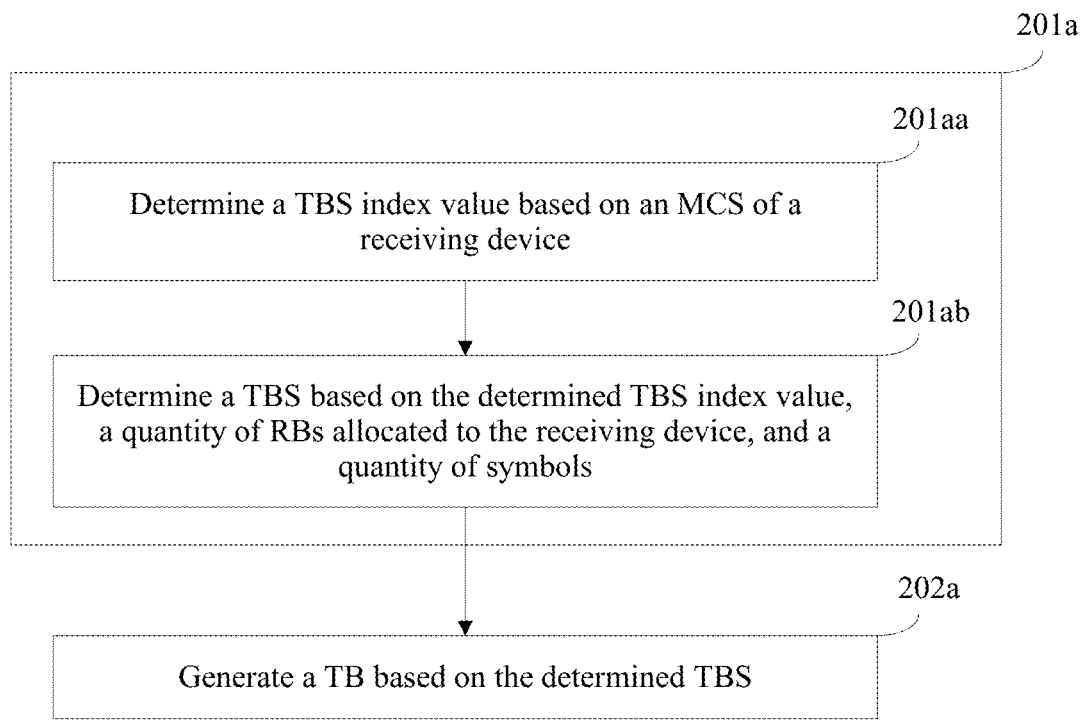
FIG. 5a is a flowchart of a TB generation method according to an embodiment of the present disclosure.

FIG. 5a is a flowchart of a TB generation method according to an example embodiment of this application. In the embodiment shown in FIG. 5a, a sending device (the base station shown in FIG. 4) allocates a time-frequency resource to a receiving device (for example, a terminal), and the time-frequency resource allocated to the receiving device includes one or more RBs. As shown in FIG. 5a, the method includes the following steps.

Step 201a: Determine a TBS based on an MCS of the receiving device, a quantity of RBs allocated to the receiving device, and a quantity of symbols.

In this embodiment, each RB includes a same quantity of symbols, and the quantity of symbols based on which the TBS is determined is the quantity of symbols included in each RB.

In actual application, the sending device determines the MCS based on a channel status fed back by the receiving device, and allocates the time-frequency resource to the receiving device based on a time-frequency resource that can be scheduled, a service type of the receiving device (for example, a call or a short message service message), and the channel status fed back by the receiving device. The channel status may include one or more of a channel quality indication (CQI), a precoding matrix indicator (PMI), and a rank indication (RI). For the MCS and allocation of the time-frequency resource, refer to the prior art. Details are not described in this application.

Specifically, step 201a may include the following steps:

Step 201aa: Determine a TBS index value based on the MCS of the receiving device.

Step 201ab: Determine the TBS based on the determined TBS index value, the quantity of RBs allocated to the receiving device, and the quantity of symbols.

Optionally, step 201aa may include:

searching a TBS index table for the TBS index value corresponding to an MCS index value of the receiving device.

In this embodiment, the TBS index table is used to indicate a correspondence between an MCS index value and a TBS index value. For example, the TBS index table may be shown in the following Table 1:

| MCS index value (MCS Index) | Modulation order (Modulation Order) | TBS index value (TBS Index) |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

In actual application, in addition to the MCS index value and the TBS index value, the TBS index table may further include other information, such as a modulation order in Table 1. This is not limited in this application. Certainly, a person skilled in the art should understand that, in addition to the MCS index value and the TBS index value, the TBS index table may not include other information.

Optionally, step 201ab may include:

determining a corresponding TBS correspondence table based on the determined TBS index value; and searching the determined TBS correspondence table for the corresponding TBS based on the quantity of RBs allocated to the receiving device and the quantity of symbols.

In this embodiment, the TBS correspondence table is used to indicate a correspondence between a quantity of RBs, a quantity of symbols, and a TBS. In specific implementation, the TBS index value is in a one-to-one correspondence with the TBS correspondence table. When the determined TBS index value is a specified value, the corresponding TBS correspondence table may be shown in the following Table 2:

TABLE 2

| Quantity of RBs | Quantity of symbols | | | | | | | | |
|---|---|---|---|---|---|---|---|---|---|
| | 1 | 2 | 3 | 4 | 5 | 6 | 7 | ... M − 1 | M |
| 1 | X | X | X | X | X | X | X ... | X | X |
| 2 | X | X | X | X | X | X | X ... | X | X |
| 3 | X | X | X | X | X | X | X ... | X | X |
| 4 | X | X | X | X | X | X | X ... | X | X |
| 5 | X | X | X | X | X | X | X ... | X | X |
| 6 | X | X | X | X | X | X | X ... | X | X |
| 7 | X | X | X | X | X | X | X ... | X | X |
| 8 | X | X | X | X | X | X | X ... | X | X |
| 9 | X | X | X | X | X | X | X ... | X | X |
| 10 | X | X | X | X | X | X | X ... | X | X |
| 11 | X | X | X | X | X | X | X ... | X | X |
| 12 | X | X | X | X | X | X | X ... | X | X |
| 13 | X | X | X | X | X | X | X ... | X | X |
| 14 | X | X | X | X | X | X | X ... | X | X |
| 15 | X | X | X | X | X | X | X ... | X | X |
| 16 | X | X | X | X | X | X | X ... | X | X |
| 17 | X | X | X | X | X | X | X ... | X | X |
| 18 | X | X | X | X | X | X | X ... | X | X |
| ... | ... | ... | ... | ... | ... | ... | ... | ... | ... |
| N − 1 | X | X | X | X | X | X | X ... | X | X |
| N | X | X | X | X | X | X | X ... | X | X |

Step 202a: Generate a TB based on the determined TBS.
Specifically, step 202a may include:
obtaining data based on the determined TBS; and
generating the TB based on the obtained data.

In this embodiment of the present disclosure, the TBS is determined based on the MCS of the receiving device, the quantity of RBs allocated to the receiving device, and the quantity of symbols included in the RB, and the TB is generated based on the determined TBS. The quantity of symbols included in the RB is considered in a process of determining the TBS. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201a may be implemented by the processor 332 in the base station shown in FIG. 4 by executing the determining module 331b in the memory 331, and step 202a may be implemented by the processor 332 in the base station shown in FIG. 2 by executing the generation module 331c in the memory 331.

Figure 5B:
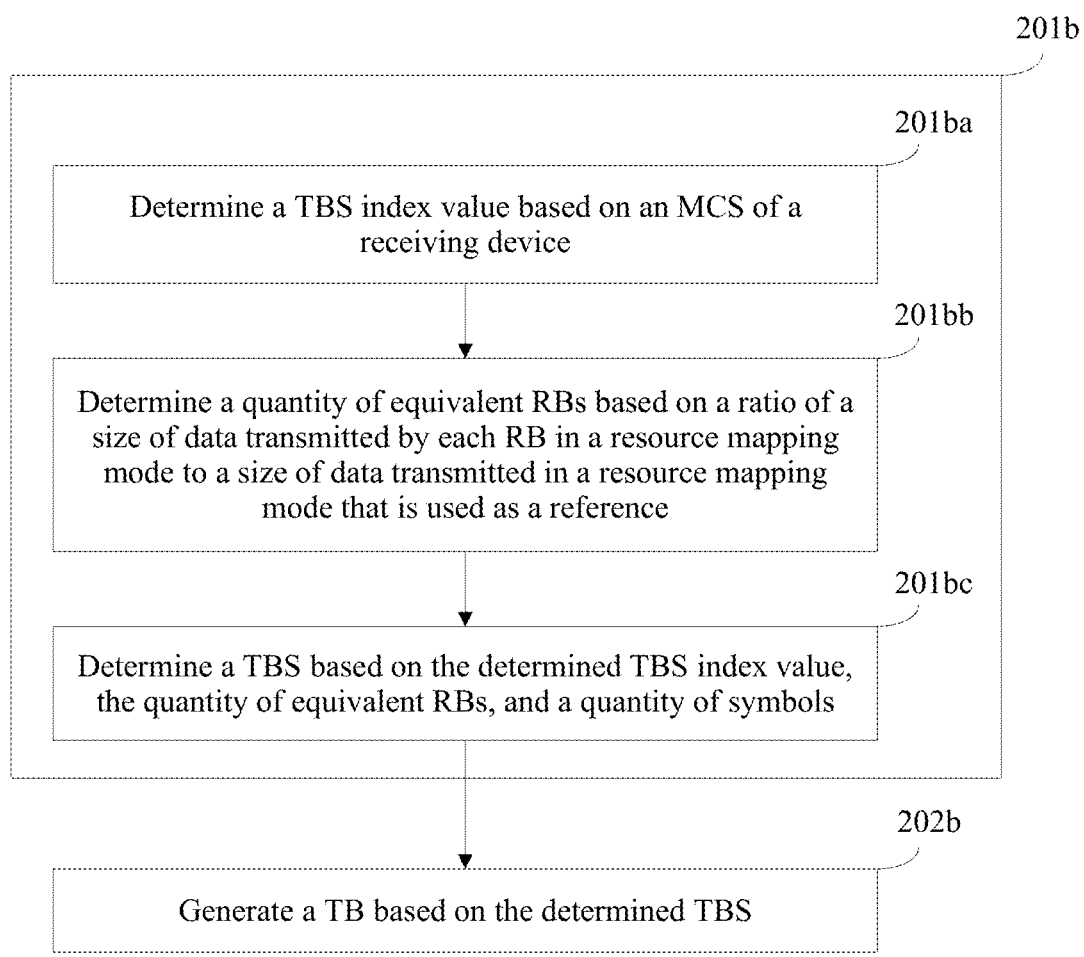
FIG. 5b is a flowchart of another TB generation method according to an embodiment of the present disclosure.

FIG. 5b is a flowchart of another TB generation method according to an example embodiment of this application. A difference between the embodiment shown in FIG. 5b and the embodiment shown in FIG. 5a lies in that a resource mapping mode used by an RB is changeable.

Figure 6:
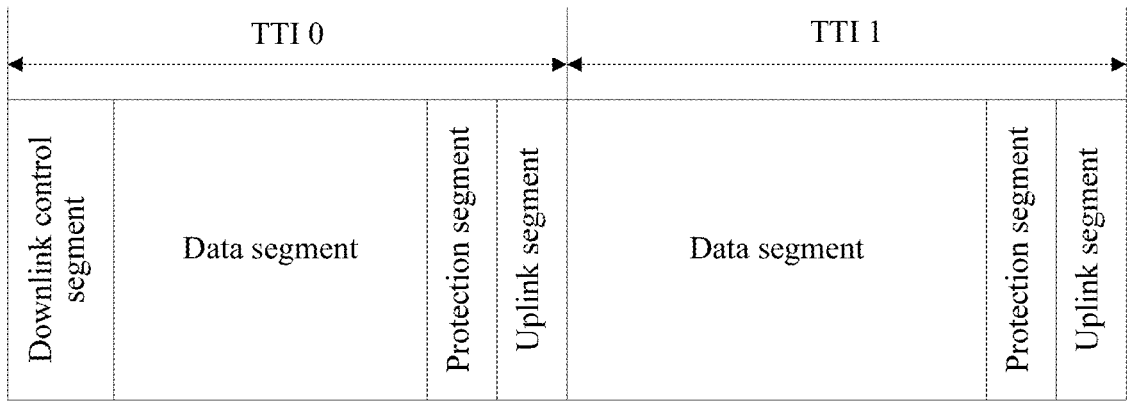
FIG. 6 is a schematic structural diagram of a resource mapping mode according to an embodiment of the present disclosure.

The resource mapping mode is a manner in which a resource is mapped to channels and signals. Different resource mapping modes are used for a same resource, and the resource mapped to at least one channel or signal in the channels and the signals has a different size. For example, referring to FIG. 6, a resource mapping mode used by an RB in a TTI 0 includes: a downlink control segment, a data segment, a protection segment, and an uplink segment, and a resource mapping mode used by an RB in a TTI 1 includes: a data segment, a protection segment, and an uplink segment. A total quantity of symbols occupied by the downlink control segment and the data segment in the TTI 0 is equal to a quantity of symbols occupied by the data segment in the TTI 1. Therefore, a ratio of a quantity of symbols occupied by the data segment in the TTI 0 to a quantity of symbols included in the TTI is less than a ratio of the quantity of symbols occupied by the data segment in the TTI 1 to a quantity of symbols included in the TTI. Therefore, data transmitted in different resource mapping modes has different sizes, and accordingly, a TBS is also different. As shown in FIG. 5b, the method includes the following steps.

Step 201b: Determine a TBS based on an MCS of a receiving device, a quantity of RBs allocated to the receiving device, and a quantity of symbols.

In this embodiment, definitions and determining methods of the MCS, the quantity of RBs, and the quantity of symbols may be the same as those in the embodiment shown in FIG. 5a. Details are not described herein again.

Specifically, step 201b may include the following steps:
Step 201ba: Determine a TBS index value based on the MCS of the receiving device.

Step 201bb: Determine a quantity of equivalent RBs based on a ratio of a size of data transmitted by each RB in a resource mapping mode to a size of data transmitted in a resource mapping mode that is used as a reference.

Step 201bc: Determine the TBS based on the determined TBS index value, the quantity of equivalent RBs, and the quantity of symbols.

In this embodiment, the quantity of equivalent RBs is associated with resource utilization of the RB. The resource utilization of the RB may be a ratio of a quantity of REs occupied by data in the RB to a quantity of REs occupied by the RB. In actual application, the resource utilization of the RB may alternatively be a ratio of a quantity of REs occupied by data in the RB to a quantity of REs other than the REs occupied by the data in the RB.

In actual application, a TBS correspondence table may be further created for each resource mapping mode. When determining the TBS, a corresponding TBS correspondence table is searched based on a used resource mapping mode. However, in this case, a workload of table creation is heavy, and it is also inconvenient to search a table. In this embodiment, a TBS correspondence table is created for the resource mapping mode that is selected as the reference. When determining the TBS, transformation is first performed based on a ratio of a size of data transmitted in a used resource mapping mode to the size of the data transmitted in the resource mapping mode that is used as the reference, and then the TBS correspondence table corresponding to the resource mapping mode that is used as the reference is searched for the corresponding TBS based on a transformation result, so that TBSs in all resource mapping modes are determined, the workload of table creation is greatly reduced, and it is also convenient to search a table.

Specifically, step 201ba may be the same as step 201aa in the embodiment shown in FIG. 5a. Details are not described herein again.

Optionally, step 201bb may include:
determining, by using a resource mapping mode as a reference, an equivalent coefficient of each RB based on a ratio of the size of the data transmitted by the RB in the resource mapping mode to a size of data transmitted in the resource mapping mode that is used as the reference; and accumulating the determined equivalent coefficient of each RB, and determining, as the quantity of equivalent RBs, a larger value between 1 and a value that is obtained after an accumulation result is rounded down.

In actual application, various resource mapping modes are fixed. Therefore, a size of data transmitted in a resource mapping mode is fixed. An equivalent coefficient table of various resource mapping modes relative to the resource mapping mode that is used as the reference may be created in advance, and the equivalent coefficient of each RB is determined by directly searching the table.

In this embodiment, the equivalent coefficient table is used to indicate a correspondence between a used resource mapping mode and an equivalent coefficient. The equivalent coefficient table may be shown in the following Table 3:

TABLE 3

| Resource mapping mode used by an RB | X | X | X | X | X | X | X | ... | X | X |
|---|---|---|---|---|---|---|---|---|---|---|
| Equivalent coefficient | X | X | X | X | X | X | X | ... | X | X |

Specifically, the quantity of equivalent RBs may be calculated by using the following formula (1):

$$N'_{RB} = \max\left(\left\lfloor \sum_{i=1}^{N_{RB}} w_i \right\rfloor, 1\right), \quad (1)$$

where $N'_{RB}$ represents the quantity of equivalent RBs, $N_{RB}$ represents the quantity of RBs, and $w_i$ represents the equivalent coefficient of each RB.

It should be noted that rounding down in the formula (1) is to ensure that the quantity of equivalent RBs does not cause the finally determined TBS to be extremely large and affect communication quality. In addition, obtaining the larger value when compared with 1 in the formula (1) is to ensure that the quantity of equivalent RBs is at least 1.

In addition, the resource mapping mode that is used as the reference may be randomly selected. This is not limited in this application.

In this embodiment, calculating the quantity of equivalent RBs is merely used as an example. In actual application, a quantity of equivalent symbols may be calculated, or the quantity of equivalent RBs and a quantity of equivalent symbols may both be calculated. A specific calculation manner may be similar to a manner of calculating the quantity of equivalent RBs that is provided in this embodiment. Details are not described herein again.

Optionally, step 201bc may include:

determining, based on the determined TBS index value, a corresponding TBS correspondence table in a TBS correspondence table (similar to Table 2) created for the resource mapping mode that is used as the reference; and searching the determined TBS correspondence table for the corresponding TBS based on the quantity of equivalent RBs and the quantity of symbols.

Step 202b: Generate a TB based on the determined TBS.

Specifically, step 202b may be the same as step 202a in the embodiment shown in FIG. 5a. Details are not described herein again.

In this embodiment of the present disclosure, when the resource mapping mode used by the RB is changeable, the quantity of equivalent RBs is determined based on the ratio of the size of the data transmitted by each RB in the resource mapping mode to the size of the data transmitted in the resource mapping mode that is used as the reference, and TBSs corresponding to the quantity of equivalent RBs in all the resource mapping modes can be found as long as the TBS correspondence table is created for the resource mapping mode that is used as the reference. This greatly reduces workloads of table creation and table searching. In addition, the TBS is determined based on the TBS index value determined based on the MCS of the receiving device, the quantity of equivalent RBs, and the quantity of symbols included in the RB. The quantity of symbols included in the RB is considered in a process of determining the TBS. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201b may be implemented by the processor 332 in the base station shown in FIG. 2 by executing the determining module 331b in the memory 331, and step 202b may be implemented by the processor 332 in the base station shown in FIG. 2 by executing the generation module 331c in the memory 331.

Figure 5C:
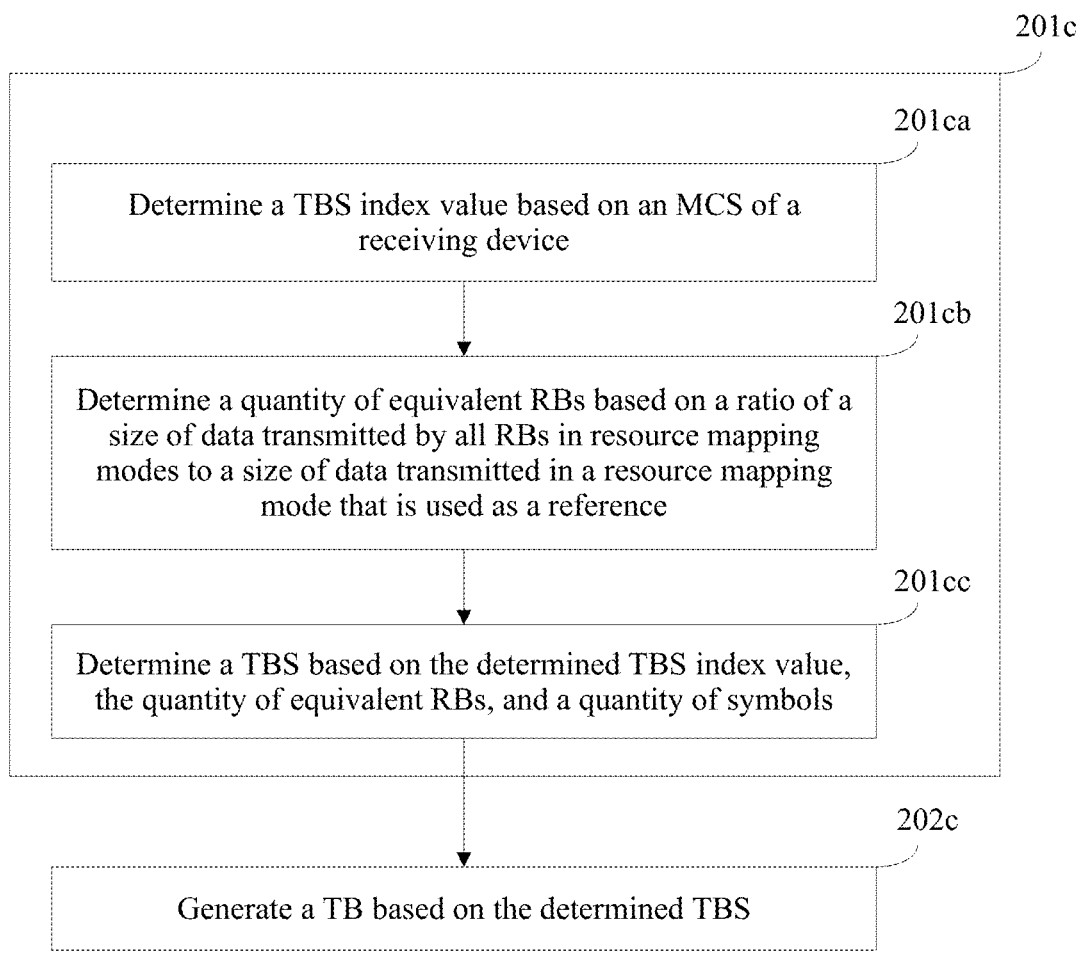
FIG. 5c is a flowchart of still another TB generation method according to an embodiment of the present disclosure.

FIG. 5c is a flowchart of still another TB generation method according to an example embodiment of this application. A difference between the embodiment shown in FIG. 5c and the embodiment shown in FIG. 5b lies in that different manners are used to determine a quantity of equivalent RBs. As shown in FIG. 5c, the method includes the following steps.

Step 201c: Determine a TBS based on an MCS of a receiving device, a quantity of RBs allocated to the receiving device, and a quantity of symbols.

In this embodiment, definitions and determining methods of the MCS, the quantity of RBs, and the quantity of symbols may be the same as those in the embodiment shown in FIG. 5a. Details are not described herein again.

Specifically, step 201c may include the following steps:

Step 201ca: Determine a TBS index value based on the MCS of the receiving device.

Step 201cb: Determine a quantity of equivalent RBs based on a ratio of a size of data transmitted by all RBs in resource mapping modes to a size of data transmitted in a resource mapping mode that is used as a reference.

Step 201cc: Determine the TBS based on the determined TBS index value, the quantity of equivalent RBs, and the quantity of symbols.

Specifically, step 201ca may be the same as step 201aa in the embodiment shown in FIG. 5a. Details are not described herein again. Step 201cc may be the same as step 201bc in the embodiment shown in FIG. 5b. Details are not described herein again.

Optionally, step 201cb may include:

determining, by using a resource mapping mode as a reference, an equivalent coefficient of all the RBs based on a ratio of the size of the data transmitted by all the RBs in the resource mapping modes to a size of data transmitted in the resource mapping mode that is used as the reference; and determining, as the quantity of equivalent RBs, a larger value between 1 and a value that is obtained after the determined equivalent coefficient of all the RBs is rounded down.

Specifically, the quantity of equivalent RBs may be calculated by using the following formula (2):

$$N'_{RB} = \max(\lfloor w \rfloor, 1) \quad (2), \text{ where}$$

$N'_{RB}$ represents the quantity of equivalent RBs, and w represents the equivalent coefficient of all the RBs.

It should be noted that the same as that in the formula (1), rounding down in the formula (2) is to ensure that the quantity of equivalent RBs does not cause the finally determined TBS to be extremely large and affect communication quality. In addition, obtaining the larger value when compared with 1 in the formula (2) is to ensure that the quantity of equivalent RBs is at least 1.

In addition, the resource mapping mode that is used as the reference may be randomly selected. This is not limited in this application.

In this embodiment, calculating the quantity of equivalent RBs is merely used as an example. In actual application, a quantity of equivalent symbols may be calculated, or the quantity of equivalent RBs and a quantity of equivalent symbols may both be calculated. A specific calculation manner may be similar to a manner of calculating the quantity of equivalent RBs that is provided in this embodiment. Details are not described herein again.

Step 202c: Generate a TB based on the determined TBS.

Specifically, step 202c may be the same as step 202a in the embodiment shown in FIG. 5a. Details are not described herein again.

In this embodiment of the present disclosure, when a resource mapping mode used by an RB is changeable, the quantity of equivalent RBs is determined based on the ratio of the size of the data transmitted by all the RBs in the resource mapping modes to the size of the data transmitted in the resource mapping mode that is used as the reference, and TBSs corresponding to the quantity of equivalent RBs in all resource mapping modes can be found as long as a TBS correspondence table is created for the resource mapping mode that is used as the reference. This greatly reduces workloads of table creation and table searching. In addition, the TBS is determined based on the TBS index value determined based on the MCS of the receiving device, the quantity of equivalent RBs, and the quantity of symbols included in the RB. The quantity of symbols included in the RB is considered in a process of determining the TBS. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201c may be implemented by the processor 332 in the base station shown in FIG. 2 by executing the determining module 331b in the memory 331, and step 202c may be implemented by the processor 332 in the base station shown in FIG. 2 by executing the generation module 331c in the memory 331.

Figure 5D:
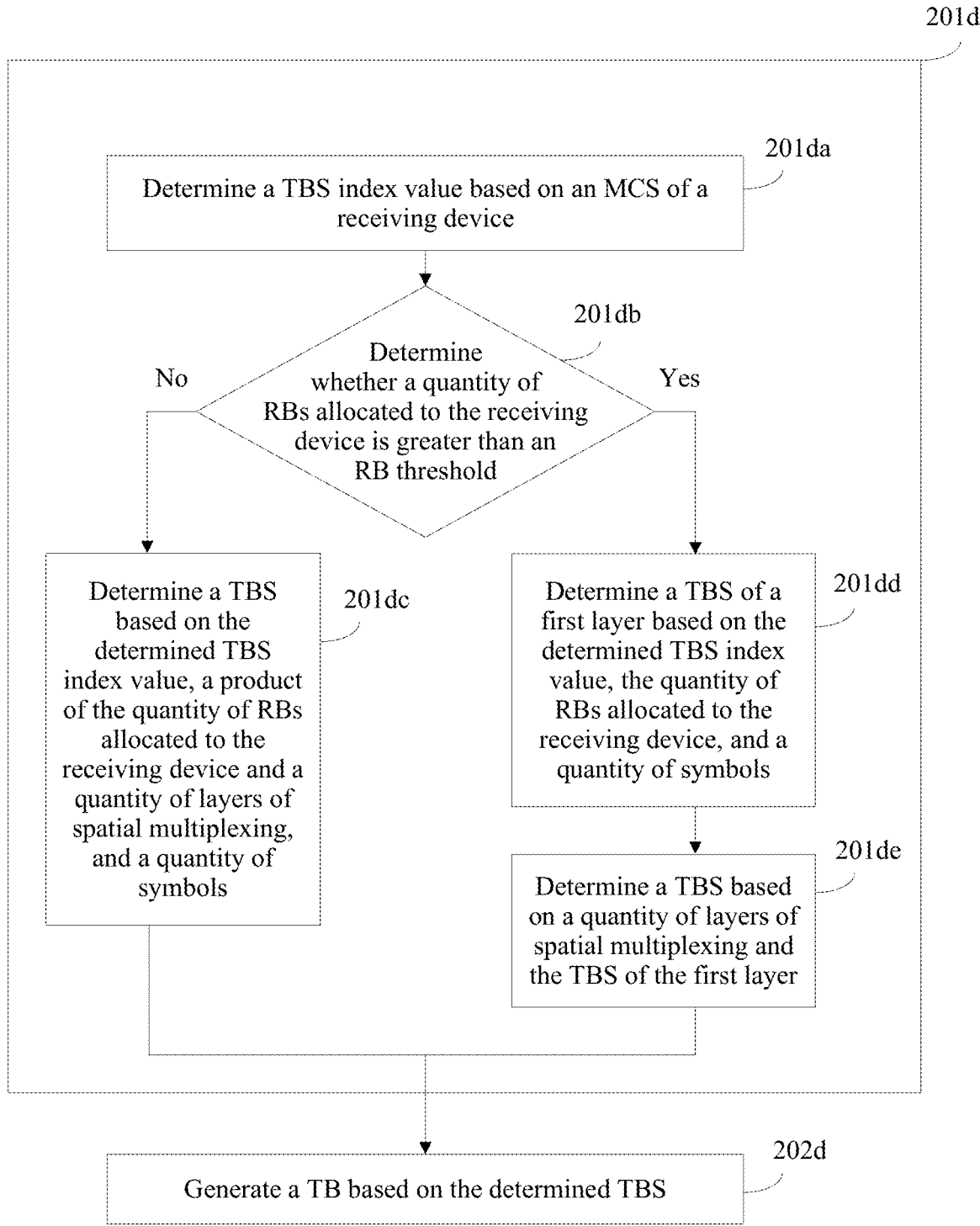
FIG. 5d is a flowchart of yet another TB generation method according to an embodiment of the present disclosure.

FIG. 5d is a flowchart of yet another TB generation method according to an example embodiment of this application. A difference between the embodiment shown in FIG. 5d and the embodiment shown in FIG. 5a lies in that data is transmitted to a receiving device by using a spatial multiplexing technology, in other words, the data transmitted to the receiving device is carried on multi-layer same time-frequency resources. As shown in FIG. 5d, the method includes the following steps.

Step 201d: Determine a TBS based on an MCS of the receiving device, a quantity of RBs allocated to the receiving device, and a quantity of symbols.

In this embodiment, definitions and determining methods of the MCS, the quantity of RBs, and the quantity of symbols may be the same as those in the embodiment shown in FIG. 5a. Details are not described herein again.

Specifically, step 201d may include the following steps:

Step 201da: Determine a TBS index value based on the MCS of the receiving device.

Step 201db: Determine whether the quantity of RBs allocated to the receiving device is greater than an RB threshold. When the quantity of RBs is less than or equal to the RB threshold, step 201dc is performed. When the quantity of RBs is greater than the RB threshold, step 201dd and step 201de are performed.

Step 201dc: Determine the TBS based on the determined TBS index value, a product of the quantity of RBs allocated to the receiving device and a quantity of layers of spatial multiplexing, and the quantity of symbols.

Step 201dd: Determine a TBS of a first layer based on the determined TBS index value, the quantity of RBs allocated to the receiving device, and the quantity of symbols.

Step 201de: Determine the TBS based on a quantity of layers of spatial multiplexing and the TBS of the first layer.

In actual application, a TBS correspondence table is created based on a size of a time-frequency resource that can be scheduled by a base station. When the spatial multiplexing technology is used, transmitted data is carried on multi-layer same time-frequency resources, and after spatial multiplexing, a size of a time-frequency resource allocated to the receiving device may exceed the size of the time-frequency resource that can be scheduled by the base station. For example, the time-frequency resource that can be scheduled by the base station includes 100 RBs, the time-frequency resource allocated by the base station to the receiving device includes two-layer RBs, where each layer includes 51 RBs, and the size (51*2=102 RBs) of the resource allocated by the base station to the receiving device exceeds the size (100 RBs) of the resource that can be scheduled by the base station. Therefore, when the spatial multiplexing technology is used, whether the size of the resource allocated by the base station to the receiving device exceeds the size of the time-frequency resource that can be scheduled by the base station is first determined, and then a TBS is determined in different manners based on a determining result.

In specific implementation, the RB threshold may be set based on the quantity of layers of spatial multiplexing and bandwidth configured by the base station (the size of the time-frequency resource that can be scheduled by the base station in frequency domain). For example, if the bandwidth configured by the base station is equivalent to 100 RBs, and the quantity of layers of spatial multiplexing is two, the RB threshold is 100/2=50. In this case, if the quantity of RBs allocated by the base station to the receiving device is 49, 49<50, to be specific, the quantity of RBs allocated to the receiving device is less than the RB threshold, and the time-frequency resource allocated to the receiving device is less than the time-frequency resource that can be scheduled by the base station. If the quantity of RBs allocated by the base station to the receiving device is 51, 51>50, to be specific, the quantity of RBs allocated to the receiving device is greater than the RB threshold, and the time-frequency resource allocated to the receiving device is greater than the time-frequency resource that can be scheduled by the base station.

It should be noted that when the quantity of RBs allocated to the receiving device is greater than the size of the time-frequency resource that can be scheduled by the base station, the base station cannot implement data transmission, the method procedure directly ends, and TBS determining and TB generation are not performed.

Specifically, step 201*da* may be the same as step 201*aa* in the embodiment shown in FIG. 5*a*. Details are not described herein again.

Optionally, step 201*dc* may include:

determining a corresponding TBS correspondence table based on the determined TBS index value; and searching the determined TBS correspondence table for the corresponding TBS based on the quantity of symbols and the product of the quantity of RBs allocated to the receiving device and the quantity of layers of spatial multiplexing.

Optionally, step 201*dd* may include:

determining a corresponding TBS correspondence table based on the determined TBS index value; and searching the determined TBS correspondence table for the corresponding TBS based on the quantity of RBs allocated to the receiving device and the quantity of symbols, and using the found TBS as the TBS of the first layer.

Optionally, step 201*de* may include:

determining a corresponding TBS conversion table based on the quantity of layers of spatial multiplexing; and searching the determined TBS conversion table for the corresponding TBS based on the quantity of layers of spatial multiplexing and the TBS of the first layer.

In this embodiment, the TBS conversion table is used to indicate a correspondence between a quantity of layers of spatial multiplexing and a TBS. In specific implementation, the quantity of layers of spatial multiplexing is in a one-to-one correspondence with the TBS conversion table. When the quantity of layers of spatial multiplexing is two, a corresponding TBS conversion table may be shown in the following Table 4:

TABLE 4

| TBS of a first layer | TBS of two layers | TBS of a first layer | TBS of two layers |
|---|---|---|---|
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |
| X | X | X | X |

Step 202*d*: Generate a TB based on the determined TBS.

Specifically, step 202*d* may be the same as step 202*a* in the embodiment shown in FIG. 5*a*. Details are not described herein again.

In this embodiment of the present disclosure, when data is transmitted to the receiving device by using the spatial multiplexing technology, whether the size of the resource allocated by the base station to the receiving device exceeds the size of the time-frequency resource that can be scheduled by the base station is first determined, and then the TBS is determined in different manners based on the determining result, resolving a problem that the TBS correspondence table cannot be directly used when the size of the resource allocated by the base station to the receiving device exceeds the size of the time-frequency resource that can be scheduled by the base station. In addition, the quantity of symbols included in the RB is considered when determining the TBS in different manners based on the determining result. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201*d* may be implemented by the processor 332 in the base station shown in FIG. 2 by executing the determining module 331*b* in the memory 331, and step 202*d* may be implemented by the processor 332 in the base station shown in FIG. 2 by executing the generation module 331*c* in the memory 331.

Figure 5E:
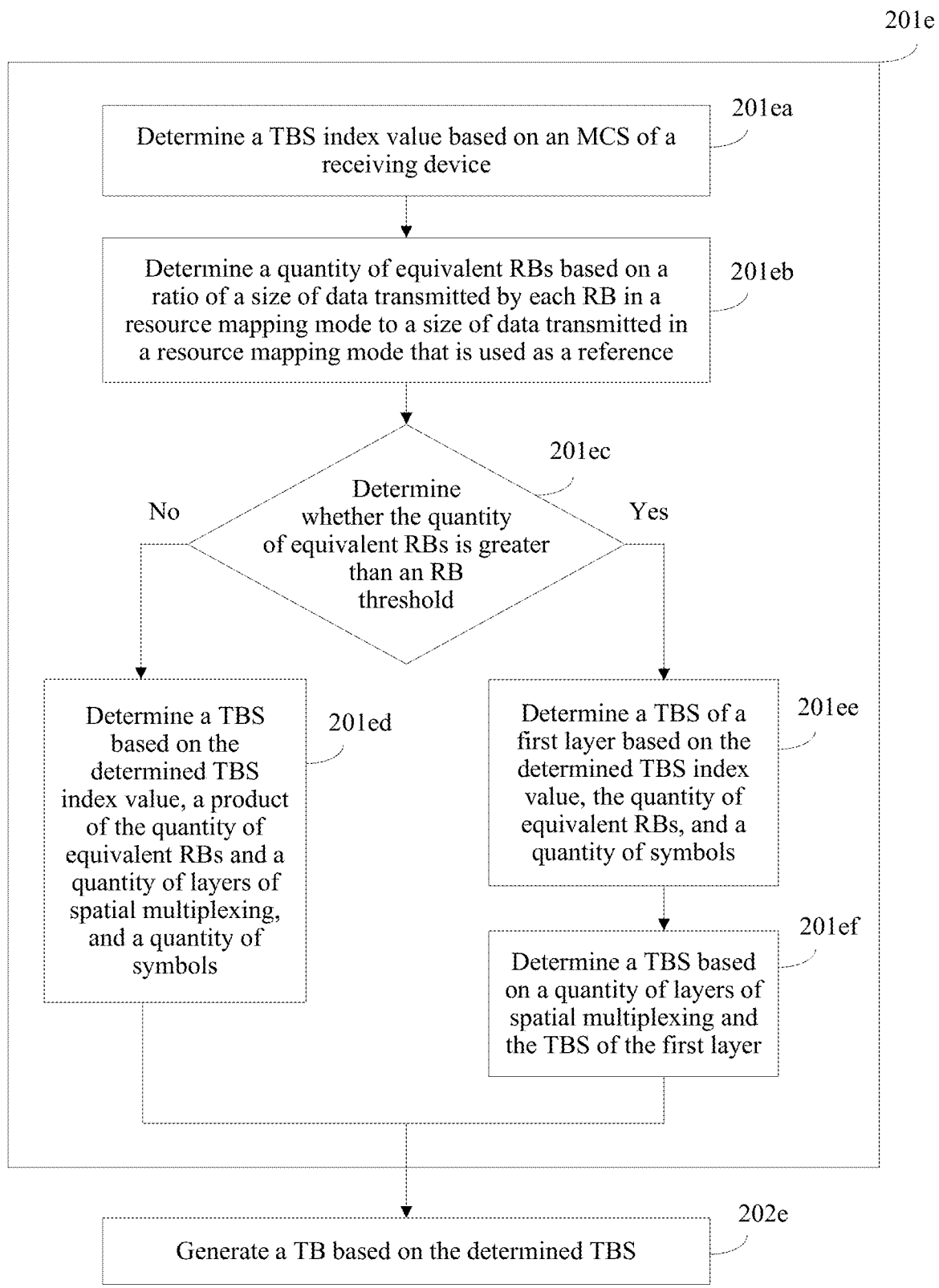
FIG. 5e is a flowchart of still yet another TB generation method according to an embodiment of the present disclosure.

FIG. 5*e* is a flowchart of still yet another TB generation method according to an example embodiment of this application. A difference between the embodiment shown in FIG. 5*e* and the embodiment shown in FIG. 5*d* lies in that a resource mapping mode used by an RB is changeable. For a description of the resource mapping mode, refer to the embodiment shown in FIG. 5*b*. Details are not described herein again. As shown in FIG. 5*e*, the method includes the following steps.

Step 201*e*: Determine a TBS based on an MCS of a receiving device, a quantity of RBs allocated to the receiving device, and a quantity of symbols.

In this embodiment, definitions and determining methods of the MCS, the quantity of RBs, and the quantity of symbols may be the same as those in the embodiment shown in FIG. 5*a*. Details are not described herein again.

Specifically, step 201*e* may include the following steps:

Step 201*ea*: Determine a TBS index value based on the MCS of the receiving device.

Step 201*eb*: Determine a quantity of equivalent RBs based on a ratio of a size of data transmitted by each RB in a resource mapping mode to a size of data transmitted in a resource mapping mode that is used as a reference.

Step 201*ec*: Determine whether the quantity of equivalent RBs is greater than an RB threshold. When the quantity of equivalent RBs is less than or equal to the RB threshold, step 201*ed* is performed. When the quantity of equivalent RBs is greater than the RB threshold, step 201*ee* and step 201*ef* are performed.

Step 201*ed*: Determine the TBS based on the determined TBS index value, a product of the quantity of equivalent RBs and a quantity of layers of spatial multiplexing, and the quantity of symbols.

Step 201*ee*: Determine a TBS of a first layer based on the determined TBS index value, the quantity of equivalent RBs, and the quantity of symbols.

Step 201*ef*: Determine the TBS based on a quantity of layers of spatial multiplexing and the TBS of the first layer.

Specifically, step 201*ea* may be the same as step 201*aa* in the embodiment shown in FIG. 5*a*. Details are not described herein again. Step 201*eb* may be the same as step 201*bb* in the embodiment shown in FIG. 5*b*. Details are not described herein again. The RB threshold may be determined in a manner provided in the embodiment shown in FIG. 5*d*. Details are not described herein again. Step 201*ef* may be the same as step 201*de* in the embodiment shown in FIG. 5*d*. Details are not described herein again.

Optionally, step 201*ed* may include:

determining a corresponding TBS correspondence table based on the determined TBS index value; and searching the determined TBS correspondence table for the corresponding TBS based on the quantity of symbols and the product of the quantity of equivalent RBs and the quantity of layers of spatial multiplexing.

Optionally, step 201*ee* may include:

determining a corresponding TBS correspondence table based on the determined TBS index value; and searching the determined TBS correspondence table for the corresponding TBS based on the quantity of equivalent RBs and the quantity of symbols, and using the found TBS as the TBS of the first layer.

Step 202*e*: Generate a TB based on the determined TBS.

Specifically, step 202*e* may be the same as step 202*a* in the embodiment shown in FIG. 5*a*. Details are not described herein again.

In this embodiment of the present disclosure, when the resource mapping mode used by the RB is changeable, the quantity of equivalent RBs is determined based on the ratio of the size of the data transmitted by each RB in the resource mapping mode to the size of the data transmitted in the resource mapping mode that is used as the reference, and TBSs corresponding to the quantity of equivalent RBs in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the quantity of symbols included in the RB is considered when determining the TBS in different manners based on the determining result. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201*e* may be implemented by the processor 332 in the base station shown in FIG. 2 by executing the determining module 331*b* in the memory 331, and step 202*e* may be implemented by the processor 332 in the base station shown in FIG. 2 by executing the generation module 331*c* in the memory 331.

Figure 5F:
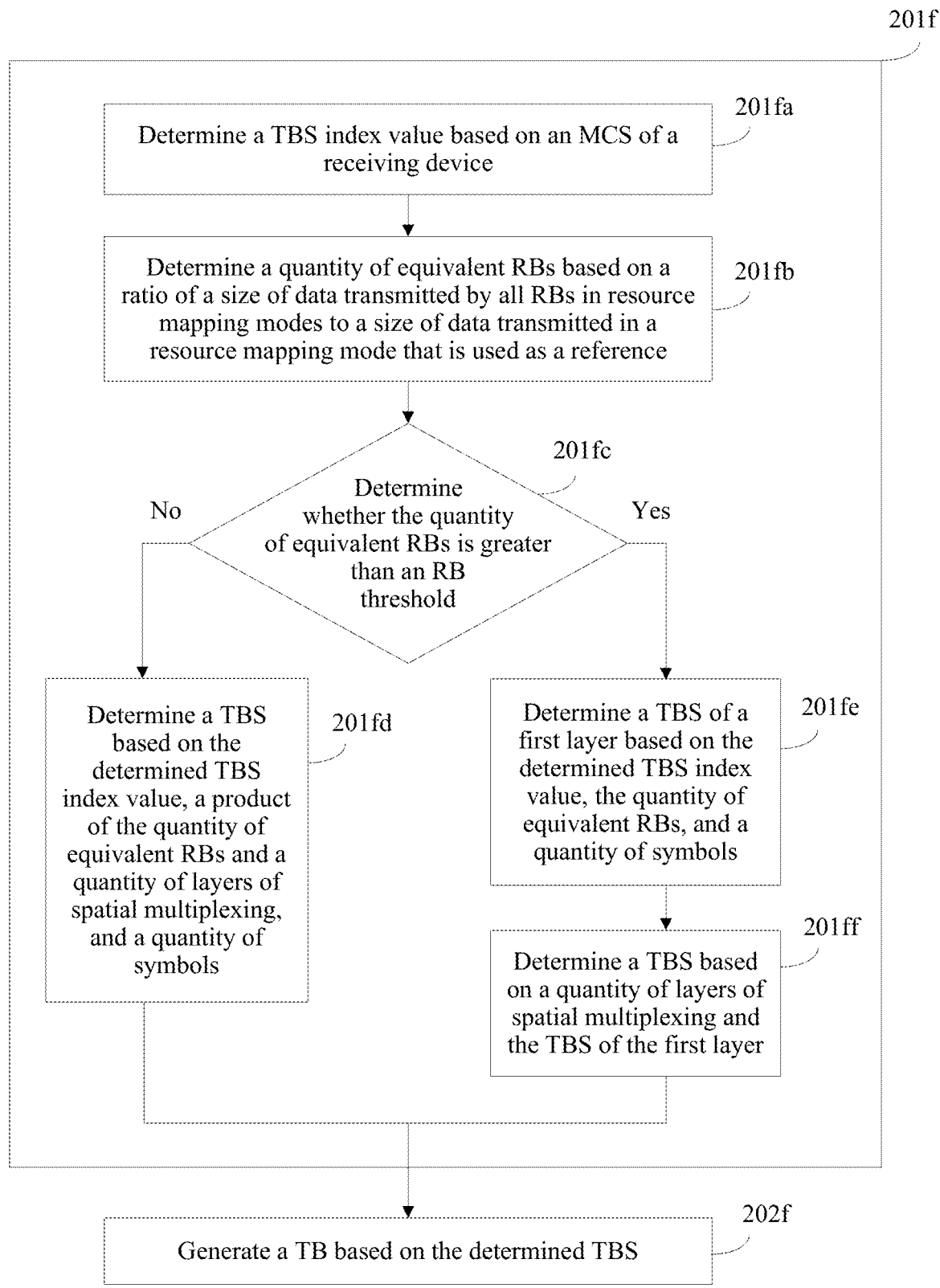
FIG. 5f is a flowchart of a further TB generation method according to an embodiment of the present disclosure.

FIG. 5*f* is a flowchart of a further TB generation method according to an example embodiment of this application. A difference between the embodiment shown in FIG. 5*f* and the embodiment shown in FIG. 5*e* lies in that different manners are used to determine a quantity of equivalent RBs. As shown in FIG. 5*f*, the method includes the following steps.

Step 201*f*: Determine a TBS based on an MCS of a receiving device, a quantity of RBs allocated to the receiving device, and a quantity of symbols.

In this embodiment, definitions and determining methods of the MCS, the quantity of RBs, and the quantity of symbols may be the same as those in the embodiment shown in FIG. 5*a*. Details are not described herein again.

Specifically, step 201*f* may include the following steps:

Step 201*fa*: Determine a TBS index value based on the MCS of the receiving device.

Step 201*fb*: Determine a quantity of equivalent RBs based on a ratio of a size of data transmitted by all RBs in resource mapping modes to a size of data transmitted in a resource mapping mode that is used as a reference.

Step 201*fc*: Determine whether the quantity of equivalent RBs is greater than an RB threshold. When the quantity of equivalent RBs is less than or equal to the RB threshold, step 201*fd* is performed. When the quantity of equivalent RBs is greater than the RB threshold, step 201*fe* and step 201*ff* are performed.

Step 201*fd*: Determine the TBS based on the determined TBS index value, a product of the quantity of equivalent RBs and a quantity of layers of spatial multiplexing, and the quantity of symbols.

Step 201*fe*: Determine a TBS of a first layer based on the determined TBS index value, the quantity of equivalent RBs, and the quantity of symbols.

Step 201*ff*: Determine the TBS based on a quantity of layers of spatial multiplexing and the TBS of the first layer.

Specifically, step 201*fa* may be the same as step 201*aa* in the embodiment shown in FIG. 5*a*. Details are not described herein again. Step 201*fb* may be the same as step 201*cb* in the embodiment shown in FIG. 5*c*. Details are not described herein again. The RB threshold may be determined in a manner provided in the embodiment shown in FIG. 5*d*. Details are not described herein again. Step 201*fd* may be the same as step 201*ed* in the embodiment shown in FIG. 5*e*. Details are not described herein again. Step 201*fe* may be the same as step 201*ee* in the embodiment shown in FIG. 5*e*. Details are not described herein again. Step 201*ff* may be the same as step 201*de* in the embodiment shown in FIG. 5*d*. Details are not described herein again.

Step 202*f*: Generate a TB based on the determined TBS.

Specifically, step 202*f* may be the same as step 202*a* in the embodiment shown in FIG. 5*a*. Details are not described herein again.

In this embodiment of the present disclosure, when a resource mapping mode used by an RB is changeable, the quantity of equivalent RBs is determined based on the ratio of the size of the data transmitted by all the RBs in the resource mapping modes to the size of the data transmitted in the resource mapping mode that is used as the reference, and TBSs corresponding to the quantity of equivalent RBs in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the quantity of symbols included in the RB is considered when determining the TBS in different manners based on the determining result. Therefore, the determined TBS may vary with the quantity of symbols included in the RB. Such generation of the TB based on the determined TBS can avoid a waste of time-frequency resources and relatively poor error-correction performance, thereby meeting a service requirement. This is applicable to TB generation when a quantity of symbols included in an RB is changeable.

It should be noted that step 201*f* may be implemented by the processor 332 in the base station shown in FIG. 2 by executing the determining module 331*b* in the memory 331, and step 202*f* may be implemented by the processor 332 in the base station shown in FIG. 2 by executing the generation module 331*c* in the memory 331.

Figure 7A:
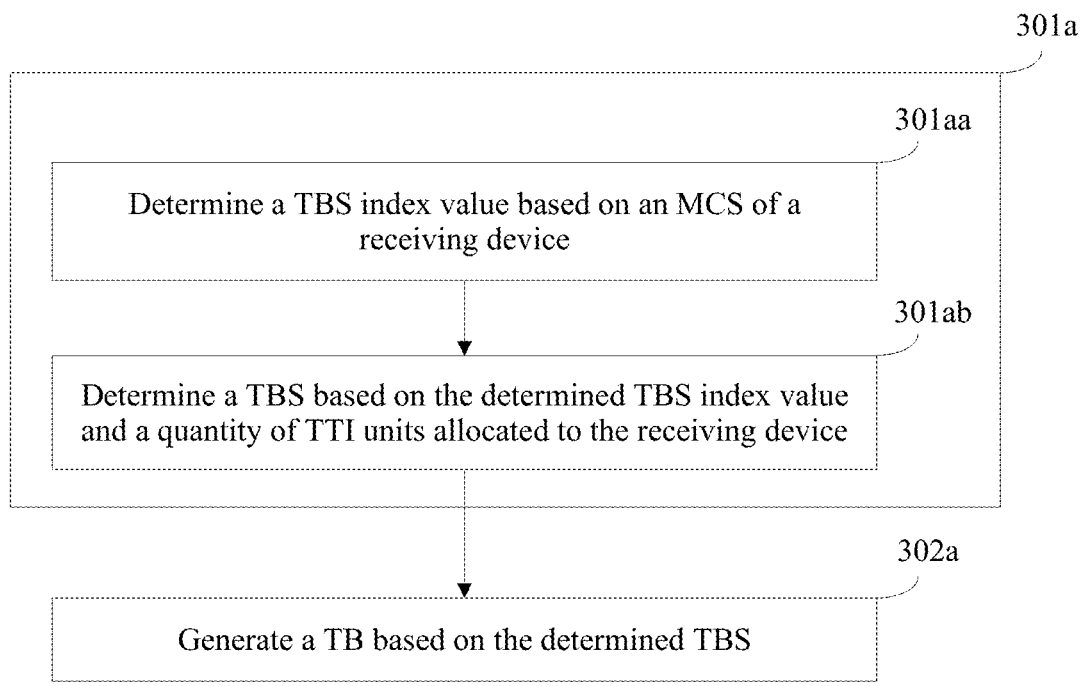
FIG. 7a is a flowchart of a TB generation method according to an embodiment of the present disclosure.

FIG. 7*a* is a flowchart of a TB generation method according to an example embodiment of this application. A difference between the embodiment shown in FIG. 7*a* and the embodiment shown in FIG. 5*a* lies in that a time-frequency resource allocated to a receiving device includes one or more TTI units (Unit TTI).

The TTI unit is carried by $N_{sc}$ consecutive subcarriers in frequency domain and $N_{Symbol}$ consecutive symbols in time domain, and both $N_{sc}$ and $N_{Symbol}$ are positive integers. $N_{sc}$ and $N_{Symbol}$ are specified values, but specific values of $N_{sc}$ and $N_{Symbol}$ are not limited in this application. For example, the TTI unit is carried by 12 consecutive subcarriers in frequency domain and seven consecutive symbols in time domain. In addition, in the time-frequency resource allocated to the receiving device, a quantity of TTI units carried by a same group of consecutive subcarriers may be any positive integer, and a quantity of TTI units carried by a same group of consecutive symbols may also be any positive integer. A quantity of TTI units in the time-frequency resource allocated to the receiving device varies with a TTI length.

As shown in FIG. 7*a*, the method includes the following steps.

Step 301*a*: Determine a TBS based on an MCS of the receiving device and the quantity of TTI units allocated to the receiving device.

In actual application, determining of the MCS and allocation of the time-frequency resource may be the same as those in the embodiment shown in FIG. 5*a*. Details are not described herein again. If the time-frequency resource is allocated to the receiving device in a unit of a resource block pair, the quantity of TTI units is calculated by using the following formula (3):

$$N_{Unit\ TTI} = (N_{RB} \times L_{Symbol})/(N_{sc} \times N_{Symbol}) \quad (3), \text{ where}$$

$N_{Unit\ TTI}$ represents the quantity of TTI units, $N_{RB}$ represents a quantity of RBs in the time-frequency resource allocated to the receiving device, $L_{Symbol}$ represents a quantity of symbols included in the RB, $N_{sc}$ represents a quantity of subcarriers occupied by the TTI unit in frequency domain, and $N_{Symbol}$ represents a quantity of symbols occupied by the TTI unit in time domain.

It can be learned from the formula (3) that the quantity of TTI units varies with the quantity of symbols included in the RB.

Specifically, step 301*a* may include the following steps:

Step 301*aa*: Determine a TBS index value based on the MCS of the receiving device.

Step 301*ab*: Determine the TBS based on the determined TBS index value and the quantity of TTI units allocated to the receiving device.

Specifically, step 301*aa* may be the same as step 201*aa* in the embodiment shown in FIG. 5*a*. Details are not described herein again.

Optionally, step 301*ab* may include:
searching a TBS correspondence table for the corresponding TBS based on the determined TBS index value and the quantity of TTI units allocated to the receiving device.

In this embodiment, the TBS correspondence table is used to indicate a correspondence between a TBS index value, a quantity of TTI units, and a TBS. For example, the TBS correspondence table may be shown in the following Table 5:

TABLE 5

| TBS index value | Quantity of TTI units | | | | | | | | | |
|---|---|---|---|---|---|---|---|---|---|---|
| | 1 | 2 | 3 | 4 | 5 | 6 | 7 | 8 | 9 | 10 |
| 0 | X | X | X | X | X | X | X | X | X | X |
| 1 | X | X | X | X | X | X | X | X | X | X |
| 2 | X | X | X | X | X | X | X | X | X | X |
| 3 | X | X | X | X | X | X | X | X | X | X |
| 4 | X | X | X | X | X | X | X | X | X | X |
| 5 | X | X | X | X | X | X | X | X | X | X |
| 6 | X | X | X | X | X | X | X | X | X | X |
| 7 | X | X | X | X | X | X | X | X | X | X |
| 8 | X | X | X | X | X | X | X | X | X | X |
| 9 | X | X | X | X | X | X | X | X | X | X |
| 10 | X | X | X | X | X | X | X | X | X | X |
| 11 | X | X | X | X | X | X | X | X | X | X |
| 12 | X | X | X | X | X | X | X | X | X | X |
| 13 | X | X | X | X | X | X | X | X | X | X |
| 14 | X | X | X | X | X | X | X | X | X | X |
| 15 | X | X | X | X | X | X | X | X | X | X |

Step 302*a*: Generate a TB based on the determined TBS.

Specifically, step 302*a* may be the same as step 202*a* in the embodiment shown in FIG. 5*a*. Details are not described herein again.

In this embodiment of the present disclosure, the TBS is determined based on the MCS of the receiving device and the quantity of TTI units allocated to the receiving device, and the TB is generated based on the determined TBS. The quantity of TTI units varies with the TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301*a* may be implemented by the processor 332 in the base station shown in FIG. 2 by executing the determining module 331*b* in the memory 331, and step 302*a* may be implemented by the processor 332 in the base station shown in FIG. 2 by executing the generation module 331*c* in the memory 331.

Figure 7B:
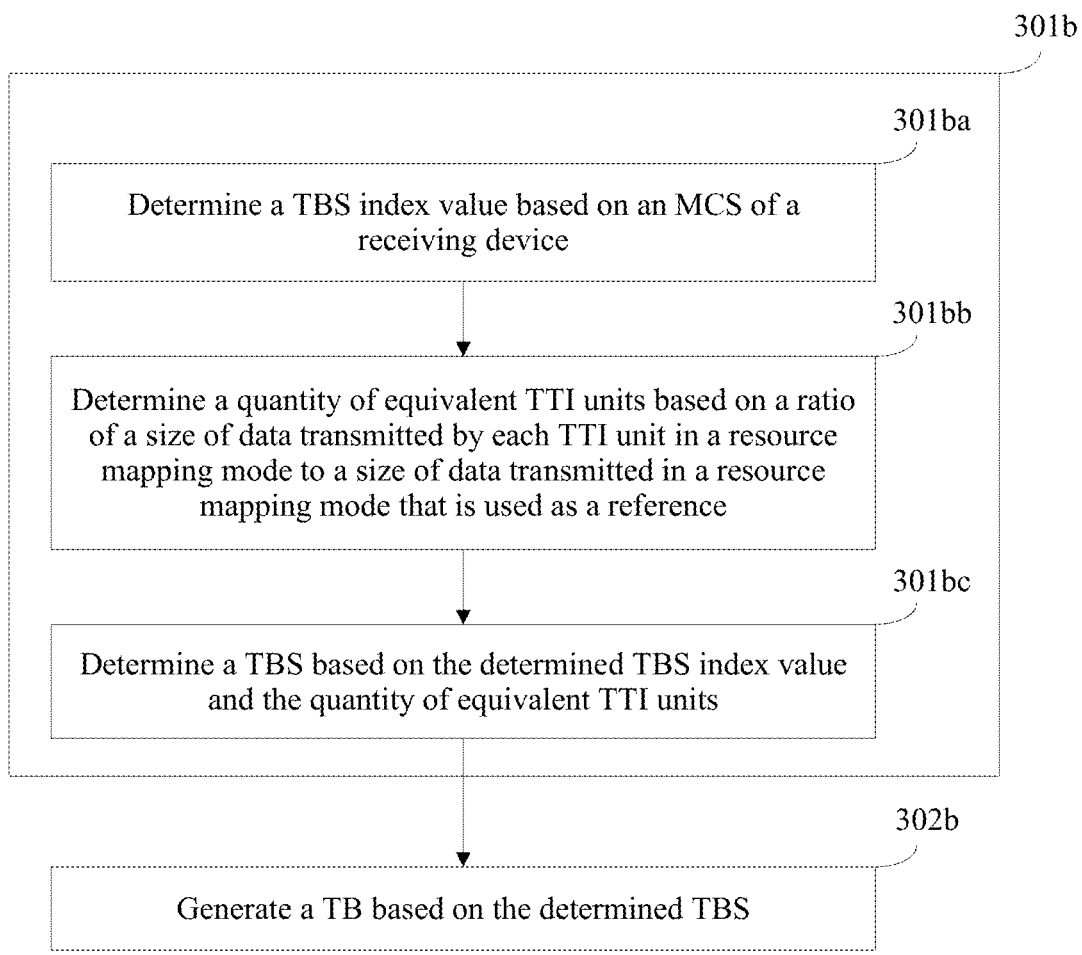
FIG. 7b is a flowchart of another TB generation method according to an embodiment of the present disclosure.

FIG. 7*b* is a flowchart of another TB generation method according to an example embodiment of this application. A difference between the embodiment shown in FIG. 7*b* and the embodiment shown in FIG. 7*a* lies in that a resource mapping mode used by a TTI unit is changeable. For a description of the resource mapping mode, refer to the embodiment shown in FIG. 5*b*. Details are not described herein again. As shown in FIG. 7*b*, the method includes the following steps.

Step 301*b*: Determine a TBS based on an MCS of a receiving device and a quantity of TTI units allocated to the receiving device.

In this embodiment, definitions and determining methods of the MCS and the TTI unit may be the same as those in the embodiment shown in FIG. 7*a*. Details are not described herein again.

Specifically, step 301*b* may include the following steps:

Step 301*ba*: Determine a TBS index value based on the MCS of the receiving device.

Step 301*bb*: Determine a quantity of equivalent TTI units based on a ratio of a size of data transmitted by each TTI unit in a resource mapping mode to a size of data transmitted in a resource mapping mode that is used as a reference.

Step 301bc: Determine the TBS based on the determined TBS index value and the quantity of equivalent TTI units.

In this embodiment, the quantity of equivalent TTI units is associated with resource utilization of the TTI unit. The resource utilization of the TTI unit may be a ratio of a quantity of REs occupied by data in the TTI unit to a quantity of REs occupied by the TTI unit. In actual application, the resource utilization of the TTI unit may alternatively be a ratio of a quantity of REs occupied by data in the TTI unit to a quantity of REs other than the REs occupied by the data in the TTI unit.

As described in the embodiment shown in FIG. 5b, a TBS correspondence table is created for the resource mapping mode that is selected as the reference. When determining the TBS, transformation is first performed based on a ratio of a size of data transmitted in a used resource mapping mode to the size of the data transmitted in the resource mapping mode that is used as the reference, and then the TBS correspondence table corresponding to the resource mapping mode that is used as the reference is searched for the corresponding TBS based on a transformation result, so that TBSs in all resource mapping modes are determined, a workload of table creation is greatly reduced, and it is also convenient to search a table.

Specifically, step 301ba may be the same as step 201aa in the embodiment shown in FIG. 5a. Details are not described herein again.

Optionally, step 301bb may include:

determining, by using a resource mapping mode as a reference, an equivalent coefficient of each TTI unit based on a ratio of the size of the data transmitted by the TTI unit in the resource mapping mode to a size of data transmitted in the resource mapping mode that is used as the reference; and accumulating the determined equivalent coefficient of each TTI unit, and determining, as the quantity of equivalent TTI units, a larger value between 1 and a value that is obtained after an accumulation result is rounded down.

Also as described in the embodiment shown in FIG. 5b, various resource mapping modes are fixed. Therefore, a size of data transmitted in a resource mapping mode is fixed. An equivalent coefficient table of various resource mapping modes relative to the resource mapping mode that is used as the reference may be created in advance, and the equivalent coefficient of each TTI unit is determined by directly searching the table.

In this embodiment, the equivalent coefficient table is used to indicate a correspondence between a resource mapping mode used by a TTI unit and an equivalent coefficient. The equivalent coefficient table may be shown in the following Table 6:

TABLE 6

| Resource mapping mode used by a TTI unit | X | X | X | X | X | X | X | ... | X | X |
|---|---|---|---|---|---|---|---|---|---|---|
| Equivalent coefficient | X | X | X | X | X | X | X | ... | X | X |

Specifically, the quantity of equivalent TTI units may be calculated by using the following formula (4):

$$N'_{Unit\,TTI} = \max\left(\left\lfloor \sum_{i=1}^{N_{Unit\,TTI}} w_i \right\rfloor, 1\right), \quad (4)$$

where $N'_{Unit\,TTI}$ represents the quantity of equivalent TTI units, $N_{Unit\,TTI}$ represents the quantity of TTI units, and $w_i$ represents the equivalent coefficient of each TTI unit.

It should be noted that rounding down in the formula (4) is to ensure that the quantity of equivalent TTI units does not cause the finally determined TBS to be extremely large and affect communication quality. In addition, obtaining the larger value when compared with 1 in the formula (4) is to ensure that the quantity of equivalent TTI units is at least 1.

In addition, the resource mapping mode that is used as the reference may be randomly selected. This is not limited in this application.

Optionally, step 301bc may include:

searching, for the corresponding TBS based on the determined TBS index value and the quantity of equivalent TTI units, the TBS correspondence table (similar to Table 5) created for the resource mapping mode that is used as the reference.

Step 302b: Generate a TB based on the determined TBS.

Specifically, step 302b may be the same as step 202a in the embodiment shown in FIG. 5a. Details are not described herein again.

In this embodiment of the present disclosure, when the resource mapping mode used by the TTI unit is changeable, the quantity of equivalent TTI units is determined based on the ratio of the size of the data transmitted by each TTI unit in the resource mapping mode to the size of the data transmitted in the resource mapping mode that is used as the reference, and TBSs corresponding to the quantity of equivalent TTI units in all the resource mapping modes can be found as long as the TBS correspondence table is created for the resource mapping mode that is used as the reference. This greatly reduces workloads of table creation and table searching. In addition, the TBS is determined based on the MCS of the receiving device and the quantity of TTI units allocated to the receiving device, and the TB is generated based on the determined TBS. The quantity of TTI units varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301b may be implemented by the processor 332 in the base station shown in FIG. 2 by executing the determining module 331b in the memory 331, and step 302b may be implemented by the processor 332 in the base station shown in FIG. 2 by executing the generation module 331c in the memory 331.

Figure 7C:
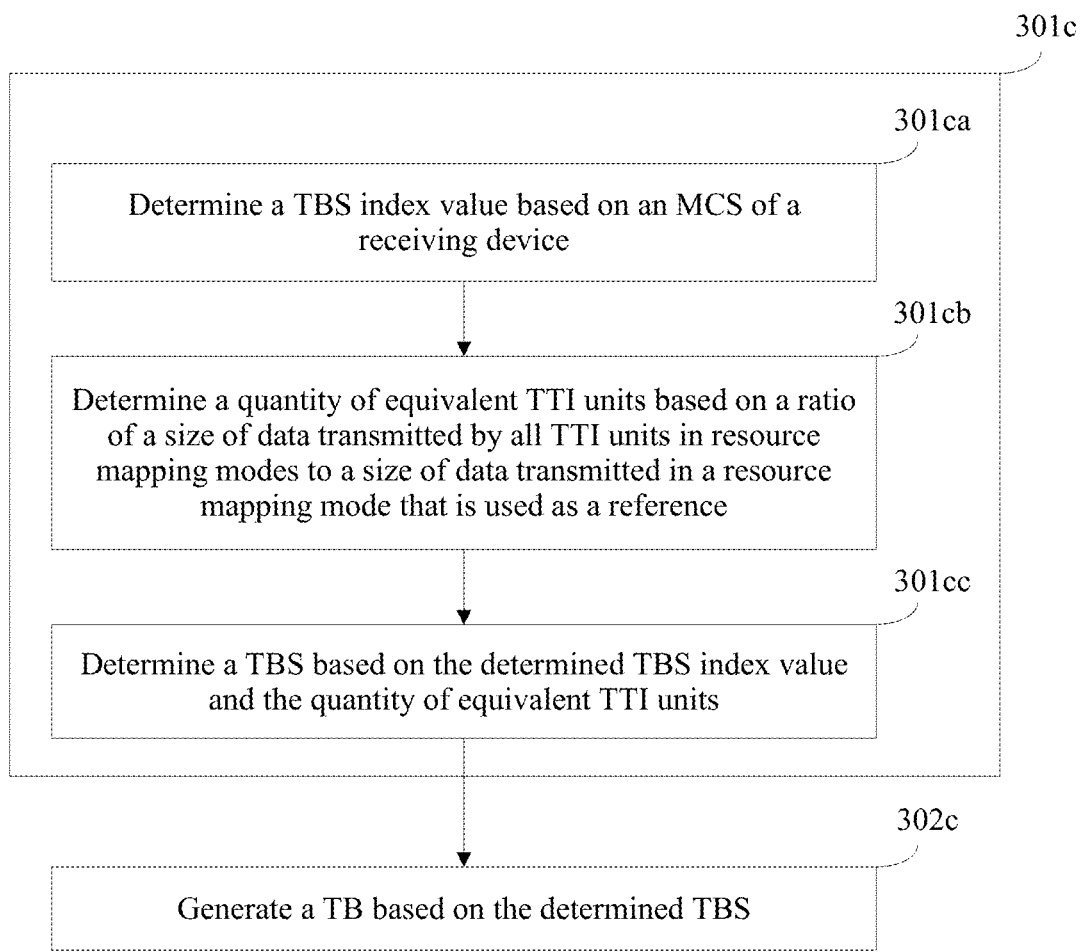
FIG. 7c is a flowchart of still another TB generation method according to an embodiment of the present disclosure.

FIG. 7c is a flowchart of still another TB generation method according to an example embodiment of this application. A difference between the embodiment shown in FIG. 7c and the embodiment shown in FIG. 7b lies in that different manners are used to determine a quantity of equivalent TTI units. As shown in FIG. 7c, the method includes the following steps.

Step 301c: Determine a TBS based on an MCS of a receiving device and a quantity of TTI units allocated to the receiving device.

In this embodiment, definitions and determining methods of the MCS and the TTI unit may be the same as those in the embodiment shown in FIG. 7a. Details are not described herein again.

Specifically, step 301c may include the following steps:

Step 301ca: Determine a TBS index value based on the MCS of the receiving device.

Step 301cb: Determine a quantity of equivalent TTI units based on a ratio of a size of data transmitted by all TTI units in resource mapping modes to a size of data transmitted in a resource mapping mode that is used as a reference.

Step 301cc: Determine the TBS based on the determined TBS index value and the quantity of equivalent TTI units.

Specifically, step 301ca may be the same as step 201aa in the embodiment shown in FIG. 5a. Details are not described herein again. Step 301cc may be the same as step 301bc in the embodiment shown in FIG. 7b. Details are not described herein again.

Optionally, step 301cb may include:

determining, by using a resource mapping mode as a reference, an equivalent coefficient of all the TTI units based on a ratio of the size of the data transmitted by all the TTI units in the resource mapping modes to a size of data transmitted in the resource mapping mode that is used as the reference; and determining, as the quantity of equivalent TTI units, a larger value between 1 and a value that is obtained after the determined equivalent coefficient of all the TTI units is rounded down.

Specifically, the quantity of equivalent TTI units may be calculated by using the following formula (5):

$$N'_{UnitTTI} = \max(\lfloor w \rfloor, 1) \quad (5), \text{where}$$

$N'_{Unit\ TTI}$ represents the quantity of equivalent TTI units, and w represents the equivalent coefficient of all the TTI units.

It should be noted that the same as that in the formula (4), rounding down in the formula (5) is to ensure that the quantity of equivalent TTI units does not cause the finally determined TBS to be extremely large and affect communication quality. In addition, obtaining the larger value when compared with 1 in the formula (5) is to ensure that the quantity of equivalent TTI units is at least 1.

In addition, the resource mapping mode that is used as the reference may be randomly selected. This is not limited in this application.

Step 302c: Generate a TB based on the determined TBS.

Specifically, step 302c may be the same as step 202a in the embodiment shown in FIG. 5a. Details are not described herein again.

In this embodiment of the present disclosure, when a resource mapping mode used by a TTI unit is changeable, the quantity of equivalent TTI units is determined based on the ratio of the size of the data transmitted by all the TTI units in the resource mapping modes to the size of the data transmitted in the resource mapping mode that is used as the reference, and TBSs corresponding to the quantity of equivalent TTI units in all resource mapping modes can be found as long as a TBS correspondence table is created for the resource mapping mode that is used as the reference. This greatly reduces workloads of table creation and table searching. In addition, the TBS is determined based on the MCS of the receiving device and the quantity of TTI units allocated to the receiving device, and the TB is generated based on the determined TBS. The quantity of TTI units varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301c may be implemented by the processor 332 in the base station shown in FIG. 2 by executing the determining module 331b in the memory 331, and step 302c may be implemented by the processor 332 in the base station shown in FIG. 2 by executing the generation module 331c in the memory 331.

Figure 7D:
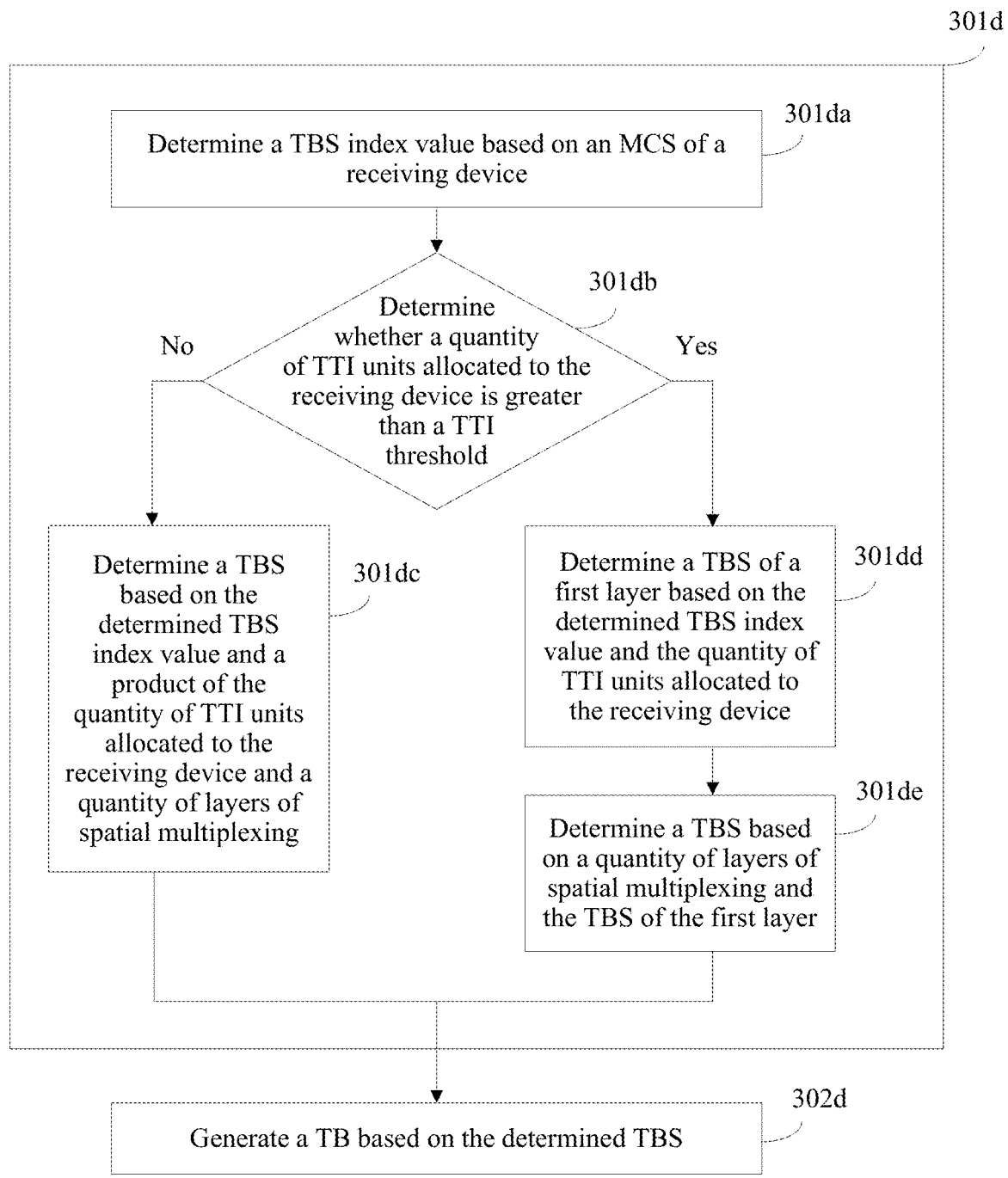
FIG. 7d is a flowchart of yet another TB generation method according to an embodiment of the present disclosure.

FIG. 7d is a flowchart of yet another TB generation method according to an example embodiment of this application. A difference between the embodiment shown in FIG. 7d and the embodiment shown in FIG. 7a lies in that data is transmitted to a receiving device by using a spatial multiplexing technology, in other words, the data transmitted to the receiving device is carried on multi-layer same time-frequency resources. As shown in FIG. 7d, the method includes the following steps.

Step 301d: Determine a TBS based on an MCS of the receiving device and a quantity of TTI units allocated to the receiving device.

In this embodiment, definitions and determining methods of the MCS and the TTI unit may be the same as those in the embodiment shown in FIG. 7a. Details are not described herein again.

Specifically, step 301d may include the following steps:

Step 301da: Determine a TBS index value based on the MCS of the receiving device.

Step 301db: Determine whether the quantity of TTI units allocated to the receiving device is greater than a TTI threshold. When the quantity of TTI units is less than or equal to the TTI unit threshold, step 301dc is performed. When the quantity of TTI units is greater than the TTI threshold, step 301dd and step 301de are performed.

Step 301dc: Determine the TBS based on the determined TBS index value and a product of the quantity of TTI units allocated to the receiving device and a quantity of layers of spatial multiplexing.

Step 301dd: Determine a TBS of a first layer based on the determined TBS index value and the quantity of TTI units allocated to the receiving device.

Step 301de: Determine the TBS based on a quantity of layers of spatial multiplexing and the TBS of the first layer.

As described in the embodiment shown in FIG. 5d, a TBS correspondence table is created based on a size of a time-frequency resource that can be scheduled by a base station. When the spatial multiplexing technology is used, transmitted data is carried on multi-layer same time-frequency resources, and after spatial multiplexing, a size of a time-frequency resource allocated to the receiving device may exceed the size of the time-frequency resource that can be scheduled by the base station. Therefore, when the spatial multiplexing technology is used, whether the size of the resource allocated by the base station to the receiving device exceeds the size of the time-frequency resource that can be scheduled by the base station is first determined, and then a TBS is determined in different manners based on a determining result. The TTI unit threshold may be set based on the quantity of layers of spatial multiplexing and the size of the time-frequency resource that can be scheduled by the base station. For example, if the time-frequency resource that can be scheduled by the base station includes 100 TTI units, and the quantity of layers of spatial multiplexing is two, the TTI unit threshold is 100/2=50. In addition, when the quantity of TTI units allocated to the receiving device is greater than the size of the time-frequency resource that can be scheduled by the base station, the base station cannot implement data transmission, the method procedure directly ends, and TBS determining and TB generation are not performed.

Specifically, step 301*da* may be the same as step 201*aa* in the embodiment shown in FIG. 5*a*. Details are not described herein again. Step 301*de* may be the same as step 201*de* in the embodiment shown in FIG. 5*d*. Details are not described herein again.

Optionally, step 301*dc* may include:

searching a TBS correspondence table for the corresponding TBS based on the determined TBS index value and the product of the quantity of TTI units allocated to the receiving device and the quantity of layers of spatial multiplexing.

Optionally, step 301*dd* may include:

searching a TBS correspondence table for the corresponding TBS based on the determined TBS index value and the quantity of TTI units allocated to the receiving device, and using the found TBS as the TBS of the first layer.

Step 302*d*: Generate a TB based on the determined TBS.

Specifically, step 302*d* may be the same as step 202*a* in the embodiment shown in FIG. 5*a*. Details are not described herein again.

In this embodiment of the present disclosure, when data is transmitted to the receiving device by using the spatial multiplexing technology, whether the size of the resource allocated by the base station to the receiving device exceeds the size of the time-frequency resource that can be scheduled by the base station is first determined, and then the TBS is determined in different manners based on the determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of TTI units allocated to the receiving device, and the TB is generated based on the determined TBS. The quantity of TTI units varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301*d* may be implemented by the processor 332 in the base station shown in FIG. 2 by executing the determining module 331*b* in the memory 331, and step 302*d* may be implemented by the processor 332 in the base station shown in FIG. 2 by executing the generation module 331*c* in the memory 331.

Figure 7E:
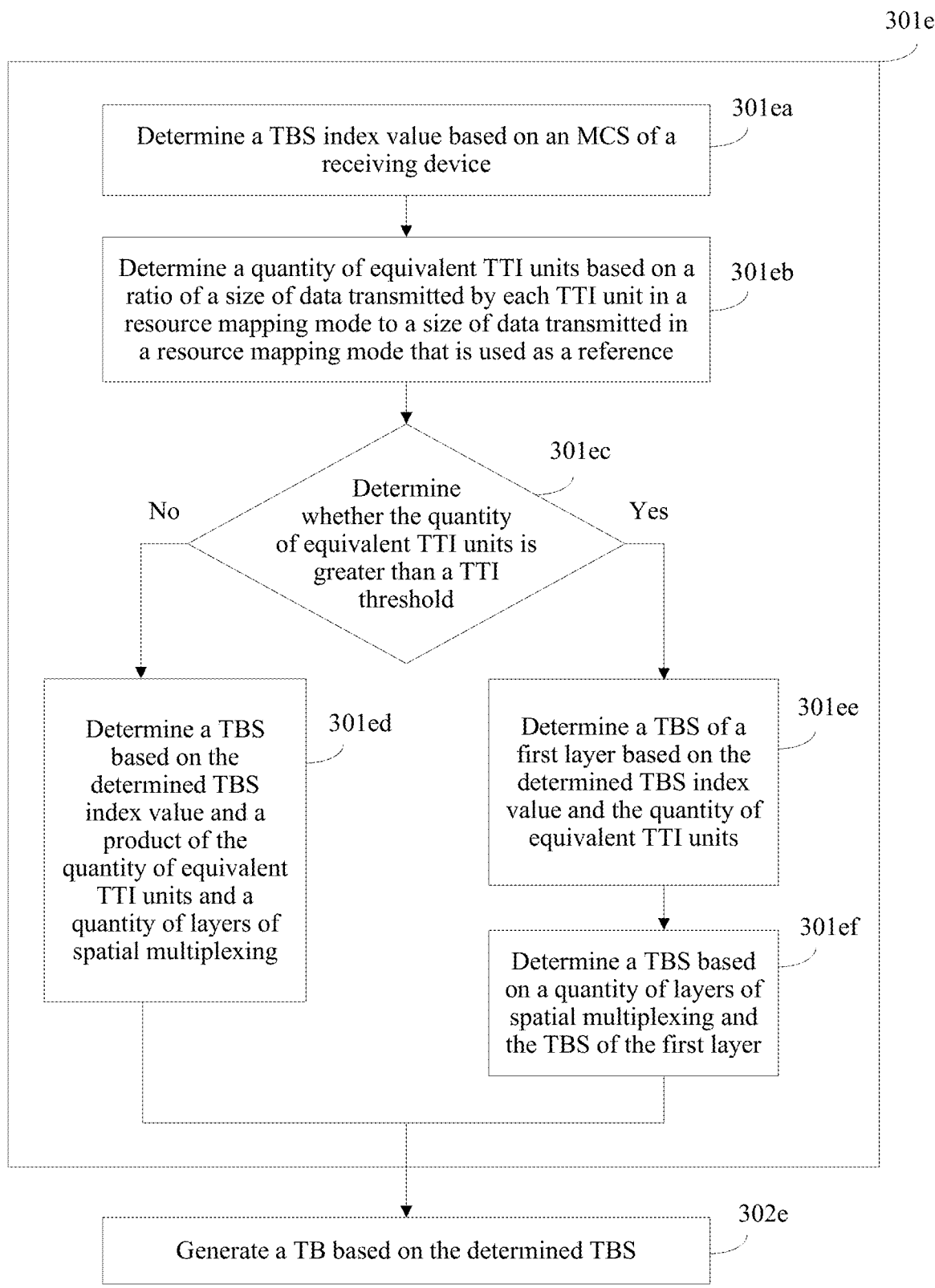
FIG. 7e is a flowchart of still yet another TB generation method according to an embodiment of the present disclosure.

FIG. 7*e* is a flowchart of still yet another TB generation method according to an example embodiment of this application. A difference between the embodiment shown in FIG. 7*e* and the embodiment shown in FIG. 7*d* lies in that a resource mapping mode used by a TTI unit is changeable. For a description of the resource mapping mode, refer to the embodiment shown in FIG. 5*b*. Details are not described herein again. As shown in FIG. 7*e*, the method includes the following steps.

Step 301*e*: Determine a TBS based on an MCS of a receiving device and a quantity of TTI units allocated to the receiving device.

In this embodiment, definitions and determining methods of the MCS and the TTI unit may be the same as those in the embodiment shown in FIG. 7*a*. Details are not described herein again.

Specifically, step 301*e* may include the following steps.

Step 301*ea*: Determine a TBS index value based on the MCS of the receiving device.

Step 301*eb*: Determine a quantity of equivalent TTI units based on a ratio of a size of data transmitted by each TTI unit in a resource mapping mode to a size of data transmitted in a resource mapping mode that is used as a reference.

Step 301*ec*: Determine whether the quantity of equivalent TTI units is greater than a TTI threshold. When the quantity of equivalent TTI units is less than or equal to the TTI unit threshold, step 301*ed* is performed. When the quantity of equivalent TTI units is greater than the TTI unit threshold, step 301*ee* and step 301*ef* are performed.

Step 301*ed*: Determine the TBS based on the determined TBS index value and a product of the quantity of equivalent TTI units and a quantity of layers of spatial multiplexing.

Step 301*ee*: Determine a TBS of a first layer based on the determined TBS index value and the quantity of equivalent TTI units.

Step 301*ef*: Determine the TBS based on a quantity of layers of spatial multiplexing and the TBS of the first layer.

Specifically, step 301*ea* may be the same as step 201*aa* in the embodiment shown in FIG. 5*a*. Details are not described herein again. Step 301*eb* may be the same as step 301*bb* in the embodiment shown in FIG. 7*b*. Details are not described herein again. The TTI unit threshold may be determined in a manner provided in the embodiment shown in FIG. 7*d*. Details are not described herein again. Step 301*ef* may be the same as step 301*de* in the embodiment shown in FIG. 7*d*. Details are not described herein again.

Optionally, step 301*ed* may include:

searching a TBS correspondence table for the corresponding TBS based on the determined TBS index value and the product of the quantity of equivalent TTI units and the quantity of layers of spatial multiplexing.

Optionally, step 301*ee* may include:

searching a TBS correspondence table for the corresponding TBS based on the determined TBS index value and a product of the quantity of equivalent TTI units and a quantity of layers of spatial multiplexing, and using the found TBS as the TBS of the first layer.

Step 302*e*: Generate a TB based on the determined TBS.

Specifically, step 302*e* may be the same as step 202*a* in the embodiment shown in FIG. 5*a*. Details are not described herein again.

In this embodiment of the present disclosure, when the resource mapping mode used by the TTI unit is changeable, the quantity of equivalent TTI units is determined based on the ratio of the size of the data transmitted by each TTI unit in the resource mapping mode to the size of the data transmitted in the resource mapping mode that is used as the reference, and TBSs corresponding to the quantity of equivalent TTI units in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of TTI units allocated to the receiving device, and the TB is generated based on the determined TBS. The quantity of TTI units varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301e may be implemented by the processor 332 in the base station shown in FIG. 2 by executing the determining module 331b in the memory 331, and step 302e may be implemented by the processor 332 in the base station shown in FIG. 2 by executing the generation module 331c in the memory 331.

Figure 7F:
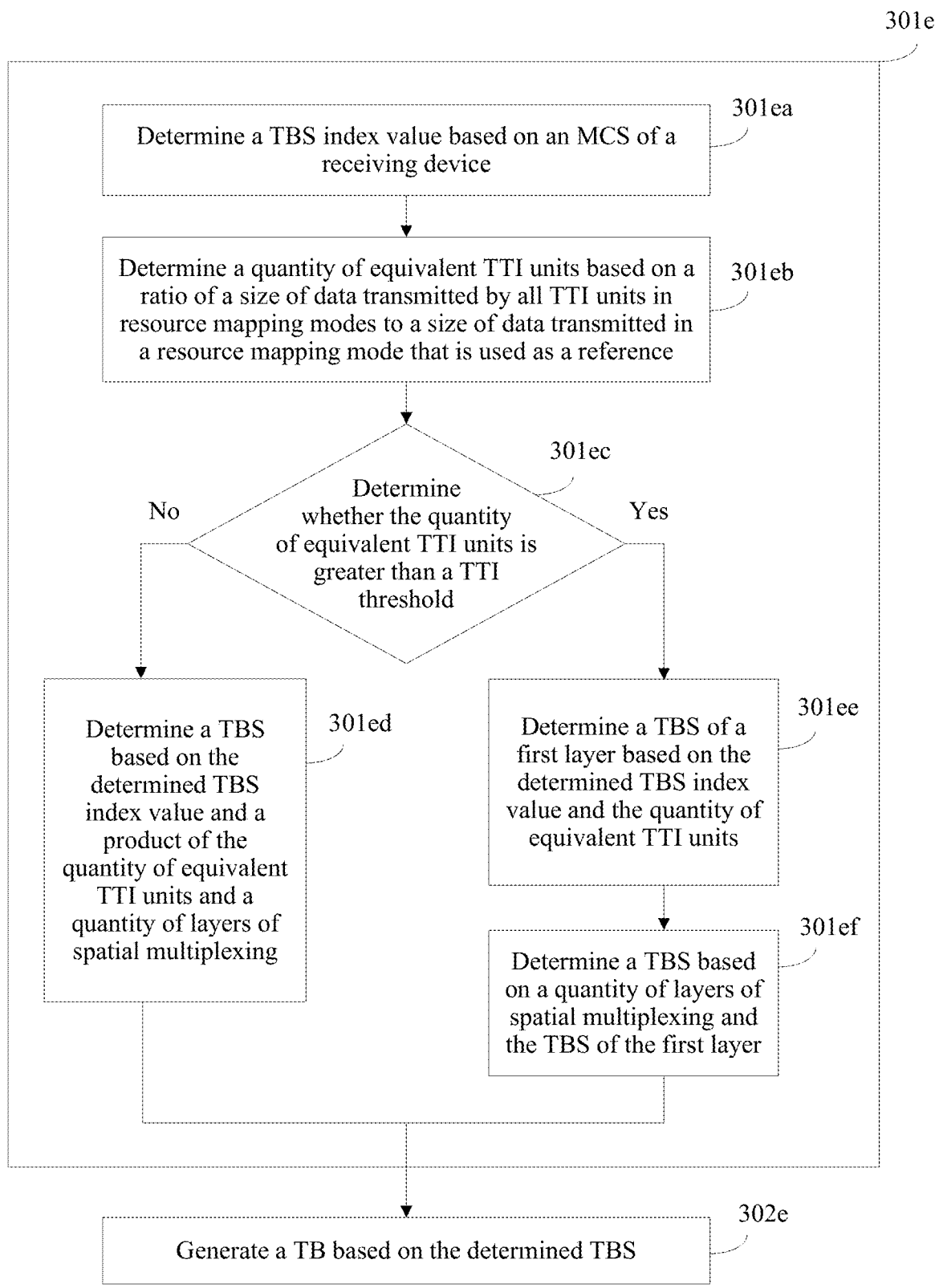
FIG. 7f is a flowchart of a further TB generation method according to an embodiment of the present disclosure.

FIG. 7f is a flowchart of a further TB generation method according to an example embodiment of this application. A difference between the embodiment shown in FIG. 7f and the embodiment shown in FIG. 7e lies in that different manners are used to determine a quantity of equivalent TTI units. As shown in FIG. 7f, the method includes the following steps.

Step 301f: Determine a TBS based on an MCS of a receiving device and a quantity of TTI units allocated to the receiving device.

In this embodiment, definitions and determining methods of the MCS and the TTI unit may be the same as those in the embodiment shown in FIG. 7a. Details are not described herein again.

Specifically, step 301f may include the following steps:

Step 301fa: Determine a TBS index value based on the MCS of the receiving device.

Step 301fb: Determine a quantity of equivalent TTI units based on a ratio of a size of data transmitted by all TTI units in resource mapping modes to a size of data transmitted in a resource mapping mode that is used as a reference.

Step 301fc: Determine whether the quantity of equivalent TTI units is greater than a TTI threshold. When the quantity of equivalent TTI units is less than or equal to the TTI unit threshold, step 301fd is performed. When the quantity of equivalent TTI units is greater than the TTI unit threshold, step 301fe and step 301ff are performed.

Step 301fd: Determine the TBS based on the determined TBS index value and a product of the quantity of equivalent TTI units and a quantity of layers of spatial multiplexing.

Step 301fe: Determine a TBS of a first layer based on the determined TBS index value and the quantity of equivalent TTI units.

Step 301ff: Determine the TBS based on a quantity of layers of spatial multiplexing and the TBS of the first layer.

Specifically, step 301fa may be the same as step 201aa in the embodiment shown in FIG. 5a. Details are not described herein again. Step 301fb may be the same as step 301cb in the embodiment shown in FIG. 7c. Details are not described herein again. The TTI unit threshold may be determined in a manner provided in the embodiment shown in FIG. 7d. Details are not described herein again. Step 301fd may be the same as step 301ed in the embodiment shown in FIG. 7e. Details are not described herein again. Step 301fe may be the same as step 301ee in the embodiment shown in FIG. 7e. Details are not described herein again. Step 301ff may be the same as step 301de in the embodiment shown in FIG. 7d. Details are not described herein again.

Step 302f: Generate a TB based on the determined TBS.

Specifically, step 302f may be the same as step 202a in the embodiment shown in FIG. 5a. Details are not described herein again.

In this embodiment of the present disclosure, when a resource mapping mode used by a TTI unit is changeable, the quantity of equivalent TTI units is determined based on the ratio of the size of the data transmitted by all the TTI units in the resource mapping modes to the size of the data transmitted in the resource mapping mode that is used as the reference, and TBSs corresponding to the quantity of equivalent TTI units in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of TTI units allocated to the receiving device, and the TB is generated based on the determined TBS. The quantity of TTI units varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 301f may be implemented by the processor 332 in the base station shown in FIG. 2 by executing the determining module 331b in the memory 331, and step 302f may be implemented by the processor 332 in the base station shown in FIG. 2 by executing the generation module 331c in the memory 331.

Figure 8A:
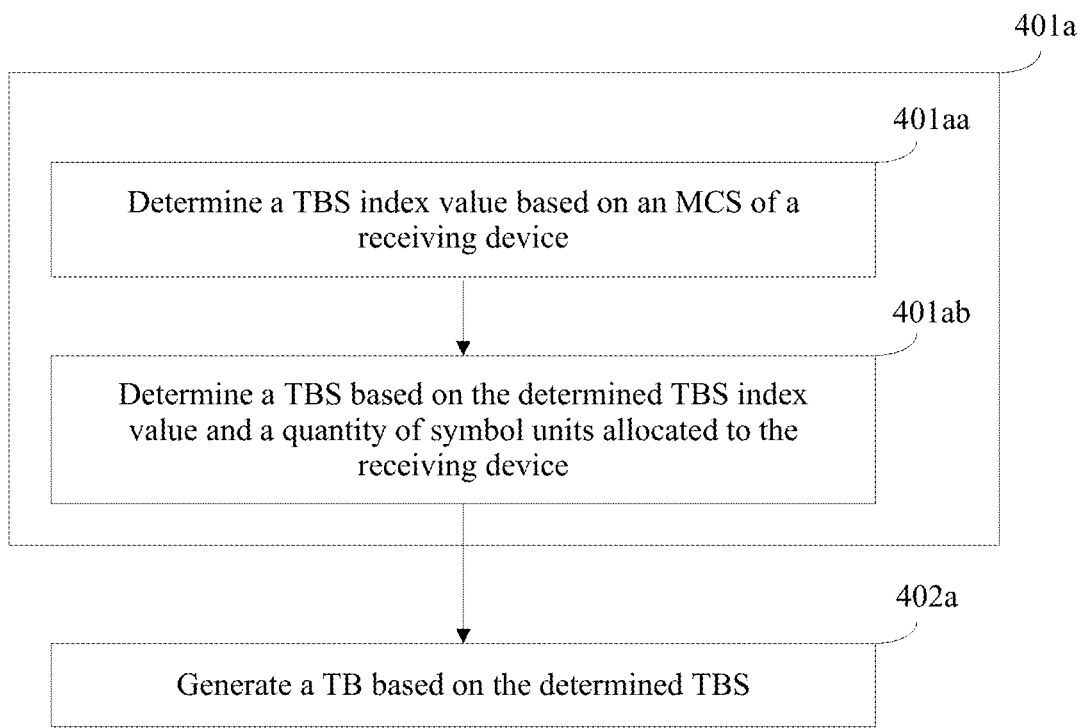
FIG. 8a is a flowchart of a TB generation method according to an embodiment of the present disclosure.

FIG. 8a is a flowchart of a TB generation method according to an example embodiment of this application. A difference between the embodiment shown in FIG. 8a and the embodiment shown in FIG. 5a lies in that a time-frequency resource allocated to a receiving device includes one or more symbol units (Symbol).

The symbol unit is carried by $N_{sc}$ consecutive subcarriers in frequency domain and $N_{Symbol}$ consecutive symbols in time domain, and both $N_{sc}$ and $N_{Symbol}$ are positive integers. $N_{sc}$ and $N_{Symbol}$ are specified values, but specific values of $N_{sc}$ and $N_{symbol}$ are not limited in this application. For example, the symbol unit is carried by 12 consecutive subcarriers in frequency domain and one symbol in time domain. In addition, in the time-frequency resource allocated to the receiving device, a quantity of symbol units carried by a same group of consecutive subcarriers may be any positive integer, and a quantity of symbol units carried by a same group of consecutive symbols may also be any positive integer. A quantity of symbol units in the time-frequency resource allocated to the receiving device varies with a symbol length.

As shown in FIG. 8a, the method includes the following steps.

Step 401a: Determine a TBS based on an MCS of the receiving device and the quantity of symbol units allocated to the receiving device.

In actual application, determining of the MCS and allocation of the time-frequency resource may be the same as those in the embodiment shown in FIG. 5a. Details are not described herein again. If the time-frequency resource is allocated to the receiving device in a unit of a resource block pair, the quantity of symbol units is calculated by using the following formula (6):

$$N_{Unit\ Symbol} = (N_{RB} \times L_{Symbol})/(N_{sc} \times N_{Symbol}) \quad (6),\text{ where}$$

$N_{Unit\ Symbol}$ represents the quantity of symbol units, $N_{RB}$ represents a quantity of RBs in the time-frequency resource allocated to the receiving device, $L_{Symbol}$ represents a quantity of symbols included in the RB, $N_{sc}$ represents a quantity of subcarriers occupied by the symbol unit in frequency domain, and $N_{Symbol}$ represents a quantity of symbols occupied by the symbol unit in time domain.

It can be learned from the formula (6) that the quantity of symbol units varies with the quantity of symbols included in the RB.

Specifically, step 401a may include the following steps:

Step 401aa: Determine a TBS index value based on the MCS of the receiving device.

Step 401ab: Determine the TBS based on the determined TBS index value and the quantity of symbol units allocated to the receiving device.

Specifically, step 401aa may be the same as step 201aa in the embodiment shown in FIG. 5a. Details are not described herein again.

Optionally, step 401ab may include:

searching a TBS correspondence table for the corresponding TBS based on the determined TBS index value and the quantity of symbol units allocated to the receiving device.

In this embodiment, the TBS correspondence table is used to indicate a correspondence between a TBS index value, a quantity of symbol units, and a TBS. For example, the TBS correspondence table may be shown in the following Table 7:

TABLE 7

| TBS index value | Quantity of symbol units | | | | | | | | | |
|---|---|---|---|---|---|---|---|---|---|---|
| | 1 | 2 | 3 | 4 | 5 | 6 | 7 | 8 | 9 | 10 |
| 0 | X | X | X | X | X | X | X | X | X | X |
| 1 | X | X | X | X | X | X | X | X | X | X |
| 2 | X | X | X | X | X | X | X | X | X | X |
| 3 | X | X | X | X | X | X | X | X | X | X |
| 4 | X | X | X | X | X | X | X | X | X | X |
| 5 | X | X | X | X | X | X | X | X | X | X |
| 6 | X | X | X | X | X | X | X | X | X | X |
| 7 | X | X | X | X | X | X | X | X | X | X |
| 8 | X | X | X | X | X | X | X | X | X | X |
| 9 | X | X | X | X | X | X | X | X | X | X |
| 10 | X | X | X | X | X | X | X | X | X | X |
| 11 | X | X | X | X | X | X | X | X | X | X |
| 12 | X | X | X | X | X | X | X | X | X | X |
| 13 | X | X | X | X | X | X | X | X | X | X |
| 14 | X | X | X | X | X | X | X | X | X | X |
| 15 | X | X | X | X | X | X | X | X | X | X |

Step 402a: Generate a TB based on the determined TBS.

Specifically, step 402a may be the same as step 202a in the embodiment shown in FIG. 5a. Details are not described herein again.

In this embodiment of the present disclosure, the TBS is determined based on the MCS of the receiving device and the quantity of symbol units allocated to the receiving device, and the TB is generated based on the determined TBS. The quantity of symbol units varies with the symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401a may be implemented by the processor 332 in the base station shown in FIG. 2 by executing the determining module 331b in the memory 331, and step 402a may be implemented by the processor 332 in the base station shown in FIG. 2 by executing the generation module 331c in the memory 331.

Figure 8B:
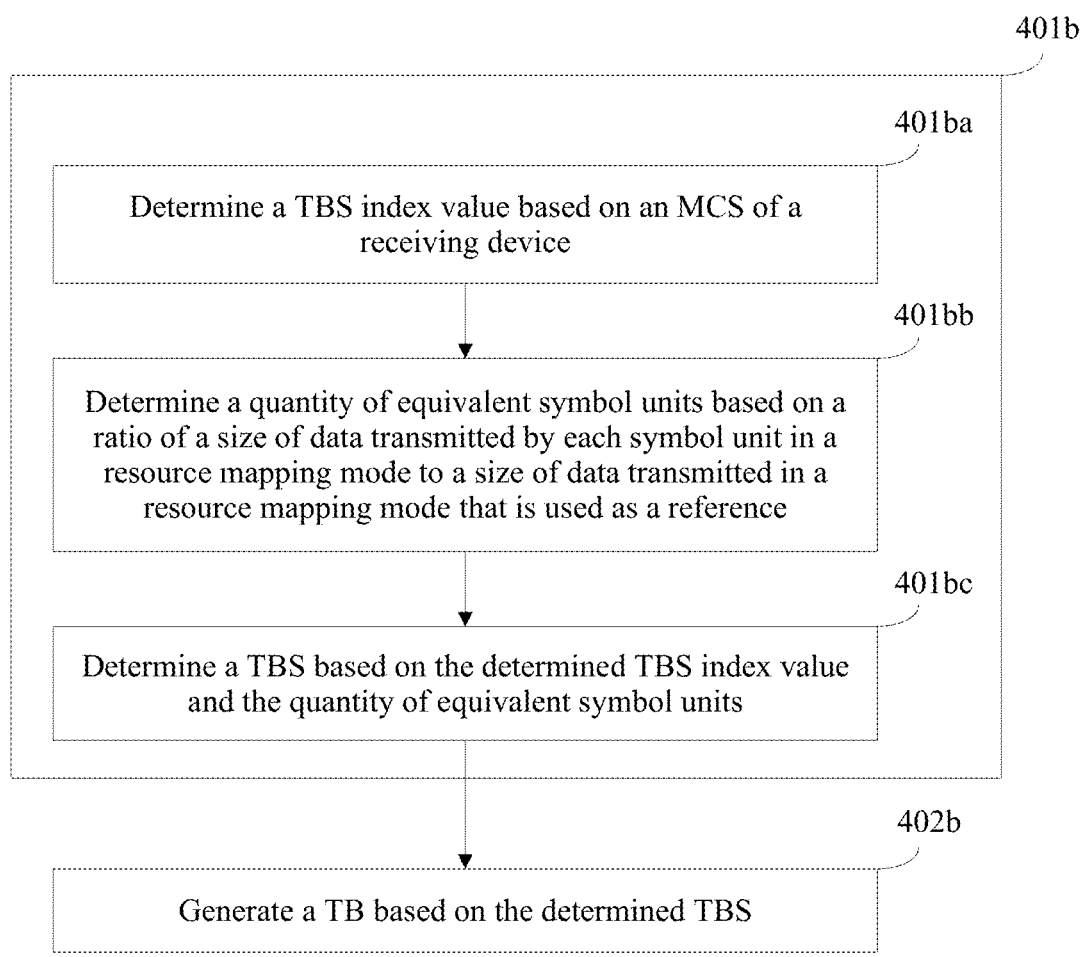
FIG. 8b is a flowchart of another TB generation method according to an embodiment of the present disclosure.

FIG. 8b is a flowchart of another TB generation method according to an example embodiment of this application. A difference between the embodiment shown in FIG. 8b and the embodiment shown in FIG. 8a lies in that a resource mapping mode used by a symbol unit is changeable. For a description of the resource mapping mode, refer to the embodiment shown in FIG. 5b. Details are not described herein again. As shown in FIG. 8b, the method includes the following steps.

Step 401b: Determine a TBS based on an MCS of a receiving device and a quantity of symbol units allocated to the receiving device.

In this embodiment, definitions and determining methods of the MCS and the symbol unit may be the same as those in the embodiment shown in FIG. 8a. Details are not described herein again.

Specifically, step 401b may include the following steps:

Step 401ba: Determine a TBS index value based on the MCS of the receiving device.

Step 401bb: Determine a quantity of equivalent symbol units based on a ratio of a size of data transmitted by each symbol unit in a resource mapping mode to a size of data transmitted in a resource mapping mode that is used as a reference.

Step 401bc: Determine the TBS based on the determined TBS index value and the quantity of equivalent symbol units.

In this embodiment, the quantity of equivalent symbol units is associated with resource utilization of the symbol unit. The resource utilization of the symbol unit may be a ratio of a quantity of REs occupied by data in the symbol unit to a quantity of REs occupied by the symbol unit. In actual application, the resource utilization of the symbol unit may alternatively be a ratio of a quantity of REs occupied by data in the symbol unit to a quantity of REs other than the REs occupied by the data in the symbol unit.

As described in the embodiment shown in FIG. 5b, a TBS correspondence table is created for the resource mapping mode that is selected as the reference. When determining the TBS, transformation is first performed based on a ratio of a size of data transmitted in a used resource mapping mode to the size of the data transmitted in the resource mapping mode that is used as the reference, and then the TBS correspondence table corresponding to the resource mapping mode that is used as the reference is searched for the corresponding TBS based on a transformation result, so that TBSs in all resource mapping modes are determined, a workload of table creation is greatly reduced, and it is also convenient to search a table.

Specifically, step 401*ba* may be the same as step 201*aa* in the embodiment shown in FIG. 5*a*. Details are not described herein again.

Optionally, step 401*bb* may include:

determining, by using a resource mapping mode as a reference, an equivalent coefficient of each symbol unit based on a ratio of the size of the data transmitted by the symbol unit in the resource mapping mode to a size of data transmitted in the resource mapping mode that is used as the reference; and accumulating the determined equivalent coefficient of each symbol unit, and determining, as the quantity of equivalent symbol units, a larger value between 1 and a value that is obtained after an accumulation result is rounded down.

Also as described in the embodiment shown in FIG. 5*b*, various resource mapping modes are fixed. Therefore, a size of data transmitted in a resource mapping mode is fixed. An equivalent coefficient table of various resource mapping modes relative to the resource mapping mode that is used as the reference may be created in advance, and the equivalent coefficient of each symbol unit is determined by directly searching the table.

In this embodiment, the equivalent coefficient table is used to indicate a correspondence between a resource mapping mode used by a symbol unit and an equivalent coefficient. The equivalent coefficient table may be shown in the following Table 8:

TABLE 8

| Resource mapping mode used by a symbol unit | X | X | X | X | X | X | X | ... | X | X |
|---|---|---|---|---|---|---|---|---|---|---|
| Equivalent coefficient | X | X | X | X | X | X | X | ... | X | X |

Specifically, the quantity of equivalent symbol units may be calculated by using the following formula (7):

$$N'_{UnitSymbol} = \max\left(\left\lfloor \sum_{i=1}^{N_{UnitSymbol}} w_i \right\rfloor, 1\right), \quad (7)$$

where $N'_{Unit\ Symbol}$ represents the quantity of equivalent symbol units, $N_{Unit\ Symbol}$ represents the quantity of symbol units, and $w_i$ represents the equivalent coefficient of each symbol unit.

It should be noted that rounding down in the formula (7) is to ensure that the quantity of equivalent symbol units does not cause the finally determined TBS to be extremely large and affect communication quality. In addition, obtaining the larger value when compared with 1 in the formula (7) is to ensure that the quantity of equivalent symbol units is at least 1.

In addition, the resource mapping mode that is used as the reference may be randomly selected. This is not limited in this application.

Optionally, step 401*bc* may include:

searching, for the corresponding TBS based on the determined TBS index value and the quantity of equivalent symbol units, the TBS correspondence table (similar to Table 7) created for the resource mapping mode that is used as the reference.

Step 402*b*: Generate a TB based on the determined TBS.

Specifically, step 402*b* may be the same as step 202*a* in the embodiment shown in FIG. 5*a*. Details are not described herein again.

In this embodiment of the present disclosure, when the resource mapping mode used by the symbol unit is changeable, the quantity of equivalent symbol units is determined based on the ratio of the size of the data transmitted by each symbol unit in the resource mapping mode to the size of the data transmitted in the resource mapping mode that is used as the reference, and TBSs corresponding to the quantity of equivalent symbol units in all the resource mapping modes can be found as long as the TBS correspondence table is created for the resource mapping mode that is used as the reference. This greatly reduces workloads of table creation and table searching. In addition, the TBS is determined based on the MCS of the receiving device and the quantity of symbol units allocated to the receiving device, and the TB is generated based on the determined TBS. The quantity of symbol units varies with a symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401*b* may be implemented by the processor 332 in the base station shown in FIG. 2 by executing the determining module 331*b* in the memory 331, and step 402*b* may be implemented by the processor 332 in the base station shown in FIG. 2 by executing the generation module 331*c* in the memory 331.

Figure 8C:
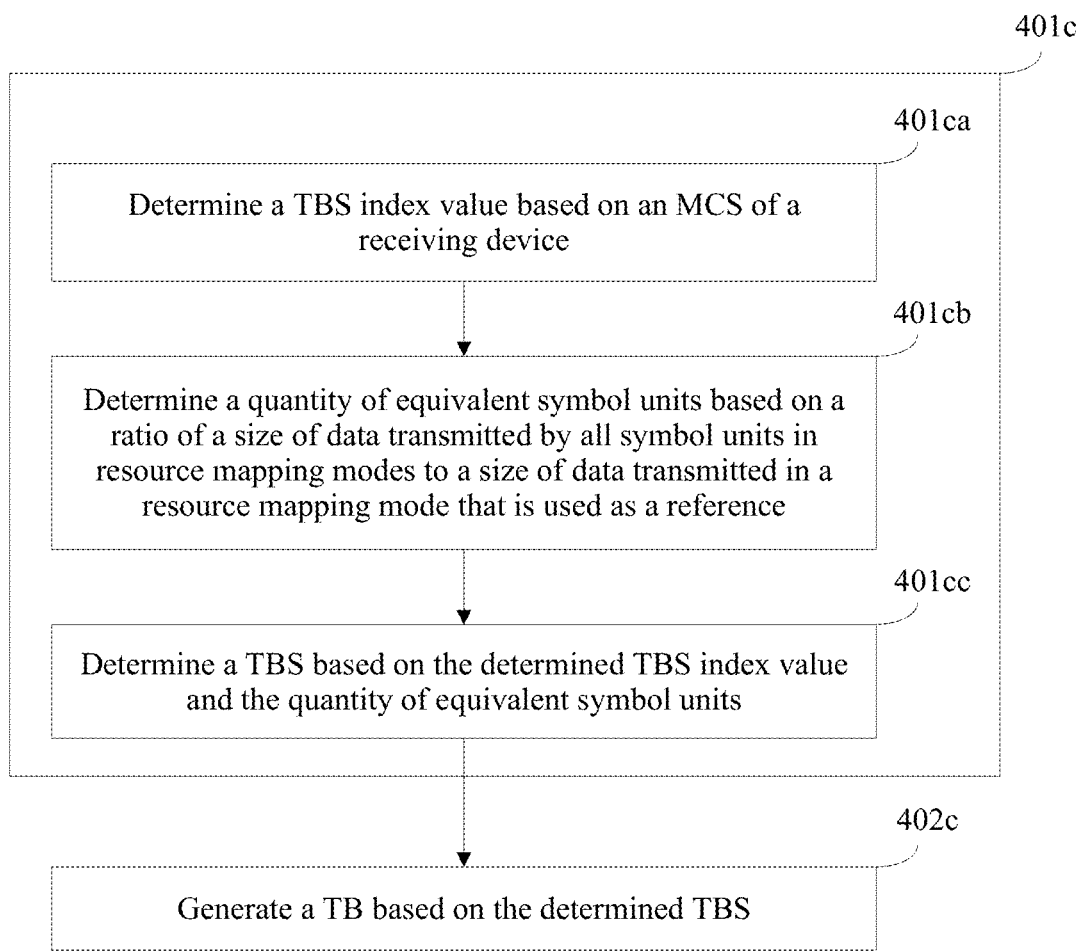
FIG. 8c is a flowchart of still another TB generation method according to an embodiment of the present disclosure.

FIG. 8*c* is a flowchart of still another TB generation method according to an example embodiment of this application. A difference between the embodiment shown in FIG. 8*c* and the embodiment shown in FIG. 8*b* lies in that different manners are used to determine a quantity of equivalent symbol units. As shown in FIG. 8*c*, the method includes the following steps.

Step 401*c*: Determine a TBS based on an MCS of a receiving device and a quantity of symbol units allocated to the receiving device.

In this embodiment, definitions and determining methods of the MCS and the symbol unit may be the same as those in the embodiment shown in FIG. 8*a*. Details are not described herein again.

Specifically, step 401*c* may include the following steps:

Step 401*ca*: Determine a TBS index value based on the MCS of the receiving device.

Step 401*cb*: Determine a quantity of equivalent symbol units based on a ratio of a size of data transmitted by all symbol units in resource mapping modes to a size of data transmitted in a resource mapping mode that is used as a reference.

Step 401*cc*: Determine the TBS based on the determined TBS index value and the quantity of equivalent symbol units.

Specifically, step 401*ca* may be the same as step 201*aa* in the embodiment shown in FIG. 5*a*. Details are not described herein again. Step 401*cc* may be the same as step 401*bc* in the embodiment shown in FIG. 8*b*. Details are not described herein again.

Optionally, step 401*cb* may include:

determining, by using a resource mapping mode as a reference, an equivalent coefficient of all the symbol units based on a ratio of the size of the data transmitted by all the symbol units in the resource mapping modes to a size of data transmitted in the resource mapping mode that is used as the reference; and determining, as the quantity of equivalent symbol units, a larger value between 1 and a value that is obtained after the determined equivalent coefficient of all the symbol units is rounded down.

Specifically, the quantity of equivalent symbol units may be calculated by using the following formula (8):

$$N'_{UnitSymbol} = \max(\lfloor w \rfloor, 1) \quad (8),\text{ where}$$

$N'_{Unit\ Symbol}$ represents the quantity of equivalent symbol units, and w represents the equivalent coefficient of all the symbol units.

It should be noted that the same as that in the formula (7), rounding down in the formula (8) is to ensure that the quantity of equivalent symbol units does not cause the finally determined TBS to be extremely large and affect communication quality. In addition, obtaining the larger value when compared with 1 in the formula (8) is to ensure that the quantity of equivalent symbol units is at least 1.

In addition, the resource mapping mode that is used as the reference may be randomly selected. This is not limited in this application.

Step 402c: Generate a TB based on the determined TBS.

Specifically, step 402c may be the same as step 202a in the embodiment shown in FIG. 5a. Details are not described herein again.

In this embodiment of the present disclosure, when a resource mapping mode used by a symbol unit is changeable, the quantity of equivalent symbol units is determined based on the ratio of the size of the data transmitted by all the symbol units in the resource mapping modes to the size of the data transmitted in the resource mapping mode that is used as the reference, and TBSs corresponding to the quantity of equivalent symbol units in all resource mapping modes can be found as long as a TBS correspondence table is created for the resource mapping mode that is used as the reference. This greatly reduces workloads of table creation and table searching. In addition, the TBS is determined based on the MCS of the receiving device and the quantity of symbol units allocated to the receiving device, and the TB is generated based on the determined TBS. The quantity of symbol units varies with a symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401c may be implemented by the processor 332 in the base station shown in FIG. 2 by executing the determining module 331b in the memory 331, and step 402c may be implemented by the processor 332 in the base station shown in FIG. 2 by executing the generation module 331c in the memory 331.

Figure 8D:
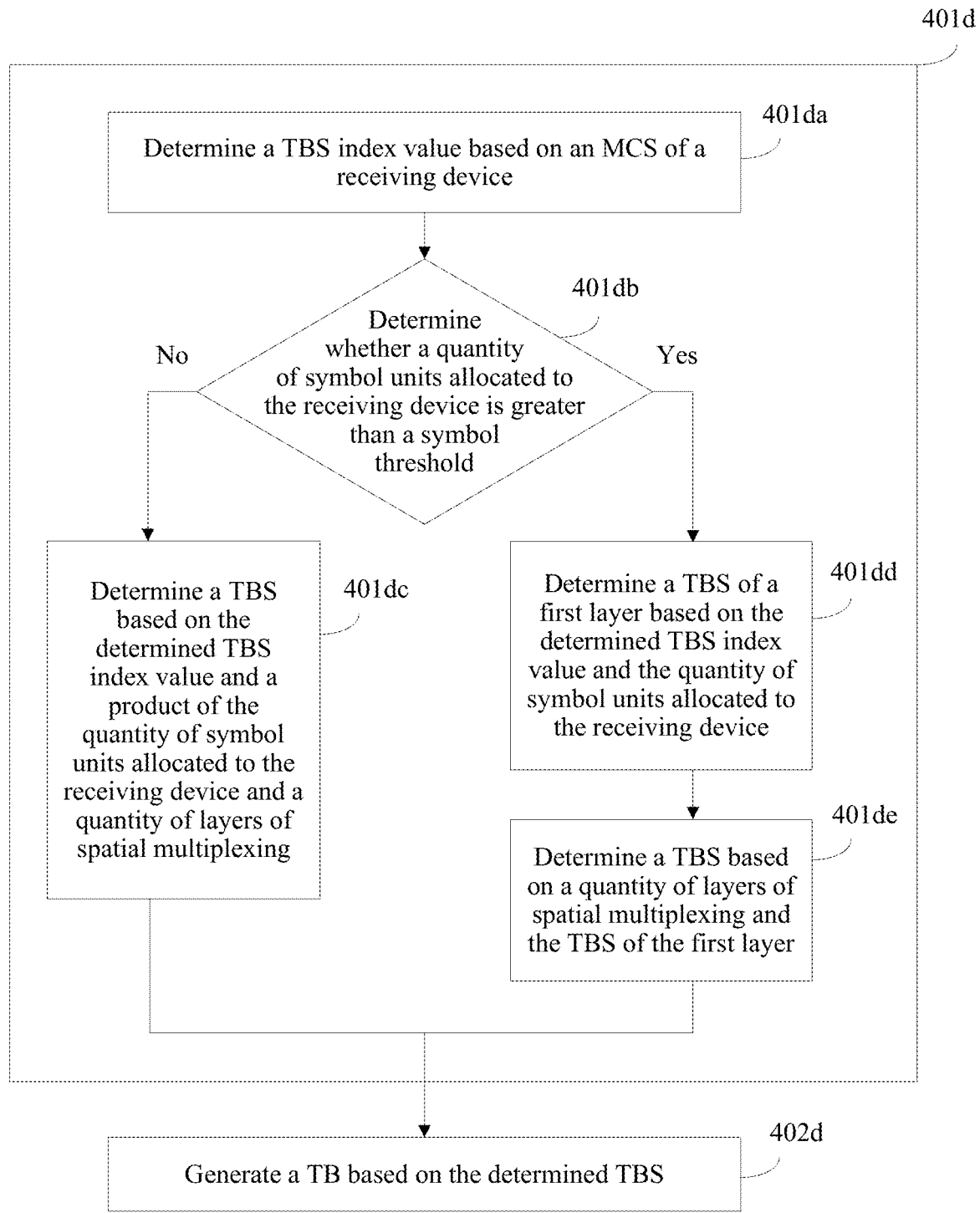
FIG. 8d is a flowchart of yet another TB generation method according to an embodiment of the present disclosure.

FIG. 8d is a flowchart of yet another TB generation method according to an example embodiment of this application. A difference between the embodiment shown in FIG. 8d and the embodiment shown in FIG. 8a lies in that data is transmitted to a receiving device by using a spatial multiplexing technology, in other words, the data transmitted to the receiving device is carried on multi-layer same time-frequency resources. As shown in FIG. 8d, the method includes the following steps.

Step 401d: Determine a TBS based on an MCS of the receiving device and a quantity of symbol units allocated to the receiving device.

In this embodiment, definitions and determining methods of the MCS and the symbol unit may be the same as those in the embodiment shown in FIG. 8a. Details are not described herein again.

Specifically, step 401d may include the following steps:

Step 401da: Determine a TBS index value based on the MCS of the receiving device.

Step 401db: Determine whether the quantity of symbol units allocated to the receiving device is greater than a symbol threshold. When the quantity of symbol units is less than or equal to the symbol unit threshold, step 401dc is performed. When the quantity of symbol units is greater than the symbol threshold, step 401dd and step 401de are performed.

Step 401dc: Determine the TBS based on the determined TBS index value and a product of the quantity of symbol units allocated to the receiving device and a quantity of layers of spatial multiplexing.

Step 401dd: Determine a TBS of a first layer based on the determined TBS index value and the quantity of symbol units allocated to the receiving device.

Step 401de: Determine the TBS based on a quantity of layers of spatial multiplexing and the TBS of the first layer.

As described in the embodiment shown in FIG. 5d, a TBS correspondence table is created based on a size of a time-frequency resource that can be scheduled by a base station. When the spatial multiplexing technology is used, transmitted data is carried on multi-layer same time-frequency resources, and after spatial multiplexing, a size of a time-frequency resource allocated to the receiving device may exceed the size of the time-frequency resource that can be scheduled by the base station. Therefore, when the spatial multiplexing technology is used, whether the size of the resource allocated by the base station to the receiving device exceeds the size of the time-frequency resource that can be scheduled by the base station is first determined, and then a TBS is determined in different manners based on a determining result. The symbol unit threshold may be set based on the quantity of layers of spatial multiplexing and the size of the time-frequency resource that can be scheduled by the base station. For example, if the time-frequency resource that can be scheduled by the base station includes 100 symbol units, and the quantity of layers of spatial multiplexing is two, the symbol unit threshold is 100/2=50. In addition, when the quantity of symbol units allocated to the receiving device is greater than the size of the time-frequency resource that can be scheduled by the base station, the base station cannot implement data transmission, the method procedure directly ends, and TBS determining and TB generation are not performed.

Specifically, step 401da may be the same as step 201aa in the embodiment shown in FIG. 5a. Details are not described herein again. Step 401de may be the same as step 201de in the embodiment shown in FIG. 5d. Details are not described herein again.

Optionally, step 401dc may include:

searching a TBS correspondence table for the corresponding TBS based on the determined TBS index value and the product of the quantity of symbol units allocated to the receiving device and the quantity of layers of spatial multiplexing.

Optionally, step 401dd may include:

searching a TBS correspondence table for the corresponding TBS based on the determined TBS index value and the quantity of symbol units allocated to the receiving device, and using the found TBS as the TBS of the first layer.

Step 402*d*: Generate a TB based on the determined TBS.

Specifically, step 402*d* may be the same as step 202*a* in the embodiment shown in FIG. 5*a*. Details are not described herein again.

In this embodiment of the present disclosure, when data is transmitted to the receiving device by using the spatial multiplexing technology, whether the size of the resource allocated by the base station to the receiving device exceeds the size of the time-frequency resource that can be scheduled by the base station is first determined, and then the TBS is determined in different manners based on the determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of symbol units allocated to the receiving device, and the TB is generated based on the determined TBS. The quantity of symbol units varies with a symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401*d* may be implemented by the processor 332 in the base station shown in FIG. 2 by executing the determining module 331*b* in the memory 331, and step 402*d* may be implemented by the processor 332 in the base station shown in FIG. 2 by executing the generation module 331*c* in the memory 331.

Figure 8E:
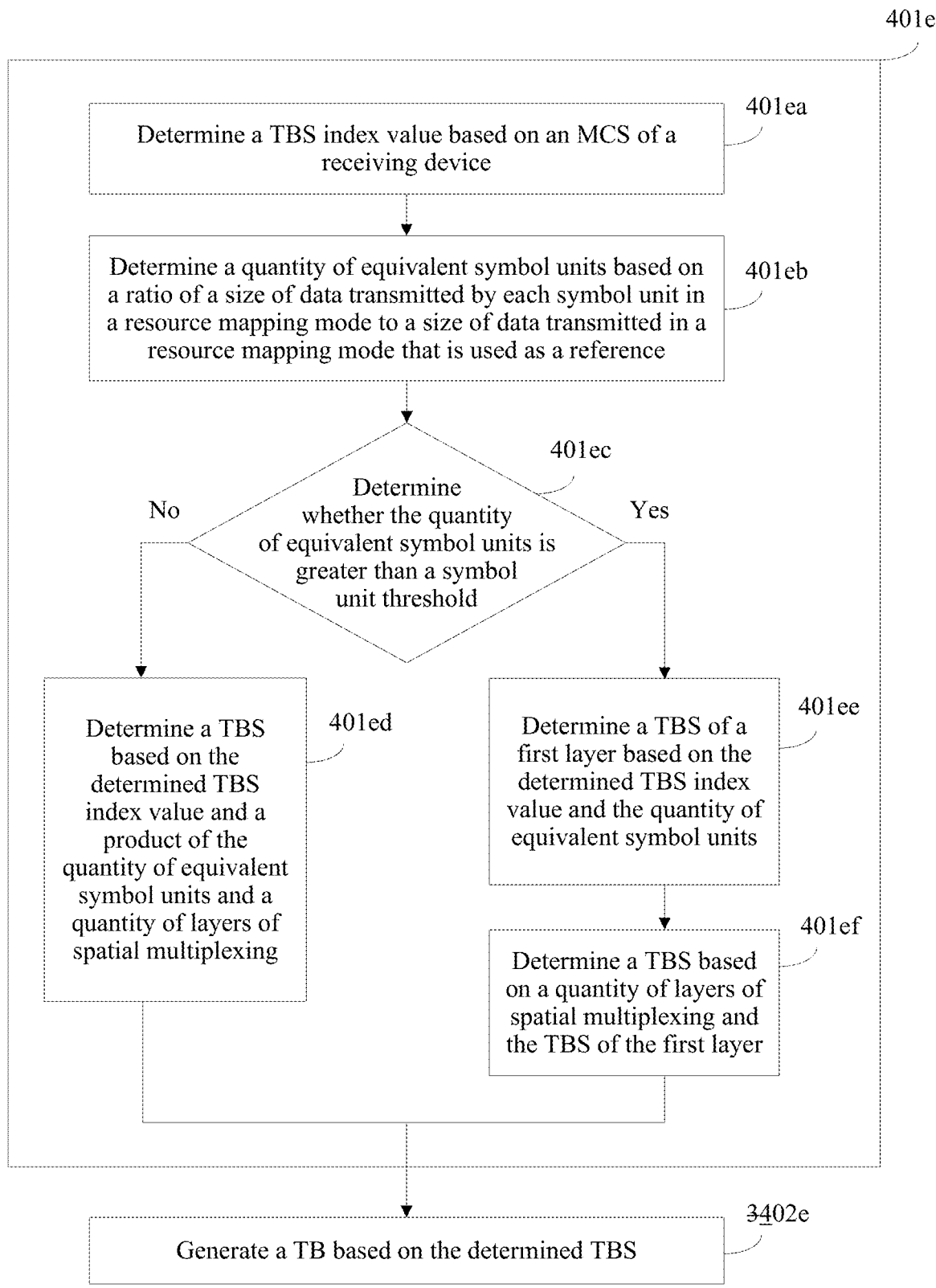
FIG. 8e is a flowchart of still yet another TB generation method according to an embodiment of the present disclosure.

FIG. 8*e* is a flowchart of still yet another TB generation method according to an example embodiment of this application. A difference between the embodiment shown in FIG. 8*e* and the embodiment shown in FIG. 8*d* lies in that a resource mapping mode used by a symbol unit is changeable. For a description of the resource mapping mode, refer to the embodiment shown in FIG. 5*b*. Details are not described herein again. As shown in FIG. 8*e*, the method includes the following steps.

Step 401*e*: Determine a TBS based on an MCS of a receiving device and a quantity of symbol units allocated to the receiving device.

In this embodiment, definitions and determining methods of the MCS and the symbol unit may be the same as those in the embodiment shown in FIG. 8*a*. Details are not described herein again.

Specifically, step 401*e* may include the following steps:

Step 401*ea*: Determine a TBS index value based on the MCS of the receiving device.

Step 401*eb*: Determine a quantity of equivalent symbol units based on a ratio of a size of data transmitted by each symbol unit in a resource mapping mode to a size of data transmitted in a resource mapping mode that is used as a reference.

Step 401*ec*: Determine whether the quantity of equivalent symbol units is greater than a symbol unit threshold. When the quantity of equivalent symbol units is less than or equal to the symbol unit threshold, step 401*ed* is performed. When the quantity of equivalent symbol units is greater than the symbol unit threshold, step 401*ee* and step 401*ef* are performed.

Step 401*ed*: Determine the TBS based on the determined TBS index value and a product of the quantity of equivalent symbol units and a quantity of layers of spatial multiplexing.

Step 401*ee*: Determine a TBS of a first layer based on the determined TBS index value and the quantity of equivalent symbol units.

Step 401*ef*: Determine the TBS based on a quantity of layers of spatial multiplexing and the TBS of the first layer.

Specifically, step 401*ea* may be the same as step 201*aa* in the embodiment shown in FIG. 5*a*. Details are not described herein again. Step 401*eb* may be the same as step 401*bb* in the embodiment shown in FIG. 8*b*. Details are not described herein again. The symbol unit threshold may be determined in a manner provided in the embodiment shown in FIG. 8*d*. Details are not described herein again. Step 401*ef* may be the same as step 401*de* in the embodiment shown in FIG. 8*d*. Details are not described herein again.

Optionally, step 401*ed* may include:

searching a TBS correspondence table for the corresponding TBS based on the determined TBS index value and the product of the quantity of equivalent symbol units and the quantity of layers of spatial multiplexing.

Optionally, step 401*ee* may include:

searching a TBS correspondence table for the corresponding TBS based on the determined TBS index value and a product of the quantity of equivalent symbol units and a quantity of layers of spatial multiplexing, and using the found TBS as the TBS of the first layer.

Step 402*e*: Generate a TB based on the determined TBS.

Specifically, step 402*e* may be the same as step 202*a* in the embodiment shown in FIG. 5*a*. Details are not described herein again.

In this embodiment of the present disclosure, when the resource mapping mode used by the symbol unit is changeable, the quantity of equivalent symbol units is determined based on the ratio of the size of the data transmitted by each symbol unit in the resource mapping mode to the size of the data transmitted in the resource mapping mode that is used as the reference, and TBSs corresponding to the quantity of equivalent symbol units in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of symbol units allocated to the receiving device, and the TB is generated based on the determined TBS. The quantity of symbol units varies with a symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401*e* may be implemented by the processor 332 in the base station shown in FIG. 2 by executing the determining module 331*b* in the memory 331, and step 402*e* may be implemented by the processor 332 in the base station shown in FIG. 2 by executing the generation module 331*c* in the memory 331.

Figure 8F:
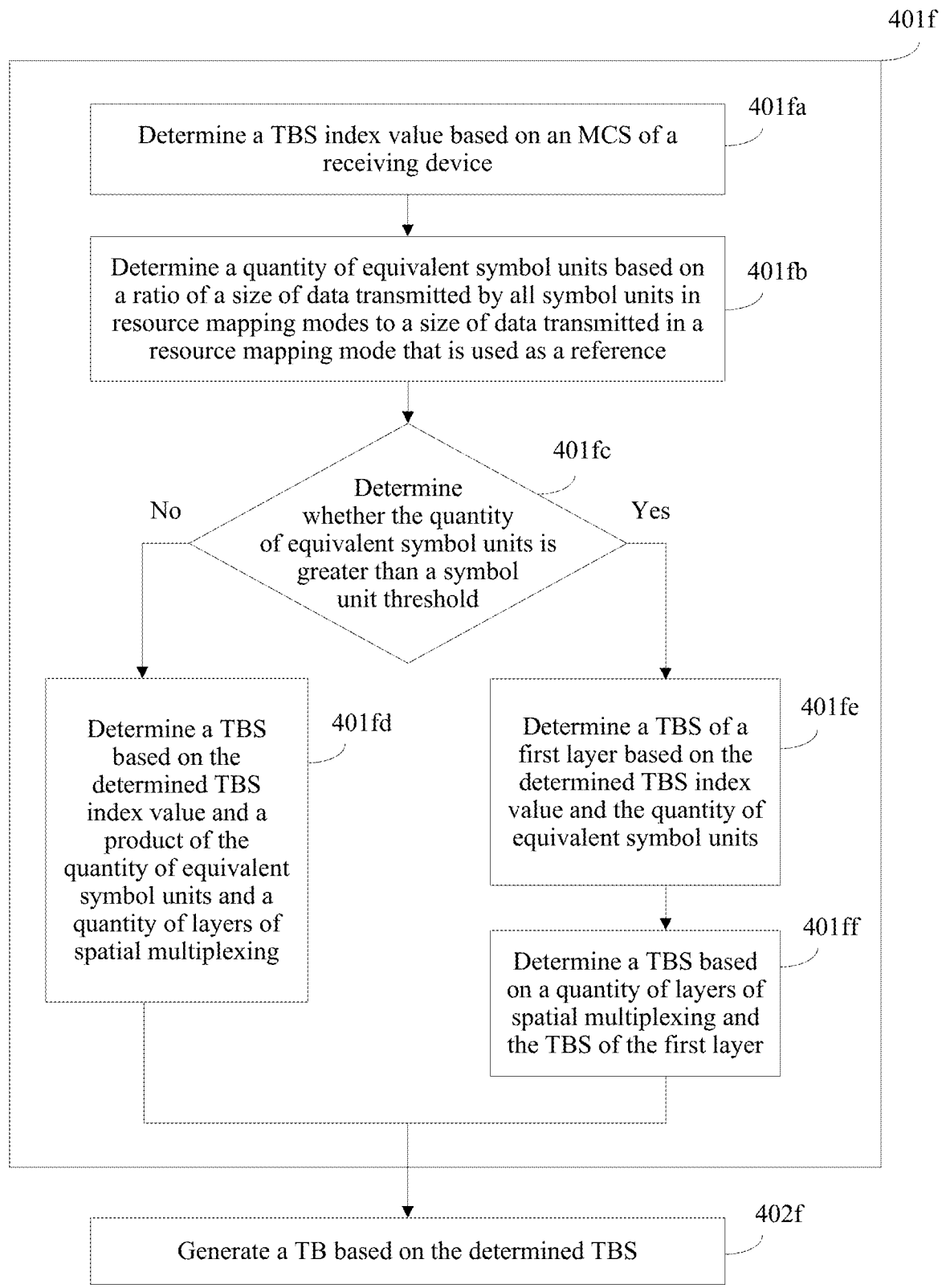
FIG. 8f is a flowchart of a further TB generation method according to an embodiment of the present disclosure.

FIG. 8*f* is a flowchart of a further TB generation method according to an example embodiment of this application. A difference between the embodiment shown in FIG. 8*f* and the embodiment shown in FIG. 8*e* lies in that different manners are used to determine a quantity of equivalent symbol units. As shown in FIG. 8*f*, the method includes the following steps.

Step 401*f*: Determine a TBS based on an MCS of a receiving device and a quantity of symbol units allocated to the receiving device.

In this embodiment, definitions and determining methods of the MCS and the symbol unit may be the same as those in the embodiment shown in FIG. 8*a*. Details are not described herein again.

Specifically, step 401*f* may include the following steps:

Step 401*fa*: Determine a TBS index value based on the MCS of the receiving device.

Step 401*fb*: Determine a quantity of equivalent symbol units based on a ratio of a size of data transmitted by all symbol units in resource mapping modes to a size of data transmitted in a resource mapping mode that is used as a reference.

Step 401*fc*: Determine whether the quantity of equivalent symbol units is greater than a symbol unit threshold. When the quantity of equivalent symbol units is less than or equal to the symbol unit threshold, step 401*fd* is performed. When the quantity of equivalent symbol units is greater than the symbol unit threshold, step 401*fe* and step 401*ff* are performed.

Step 401*fd*: Determine the TBS based on the determined TBS index value and a product of the quantity of equivalent symbol units and a quantity of layers of spatial multiplexing.

Step 401*fe*: Determine a TBS of a first layer based on the determined TBS index value and the quantity of equivalent symbol units.

Step 401*ff*: Determine the TBS based on a quantity of layers of spatial multiplexing and the TBS of the first layer.

Specifically, step 401*fa* may be the same as step 201*aa* in the embodiment shown in FIG. 5*a*. Details are not described herein again. Step 401*fb* may be the same as step 401*cb* in the embodiment shown in FIG. 8*c*. Details are not described herein again. The symbol unit threshold may be determined in a manner provided in the embodiment shown in FIG. 8*d*. Details are not described herein again. Step 401*fd* may be the same as step 401*ed* in the embodiment shown in FIG. 8*e*. Details are not described herein again. Step 401*fe* may be the same as step 401*ee* in the embodiment shown in FIG. 8*e*. Details are not described herein again. Step 401*ff* may be the same as step 401*de* in the embodiment shown in FIG. 8*d*. Details are not described herein again.

Step 402*f*: Generate a TB based on the determined TBS.

Specifically, step 402*f* may be the same as step 202*a* in the embodiment shown in FIG. 5*a*. Details are not described herein again.

In this embodiment of the present disclosure, when a resource mapping mode used by a symbol unit is changeable, the quantity of equivalent symbol units is determined based on the ratio of the size of the data transmitted by all the symbol units in the resource mapping modes to the size of the data transmitted in the resource mapping mode that is used as the reference, and TBSs corresponding to the quantity of equivalent symbol units in all resource mapping modes can be found as long as a TBS correspondence table is created for the resource mapping mode that is used as the reference. This greatly reduces workloads of table creation and table searching. In addition, when data is transmitted to the receiving device by using a spatial multiplexing technology, whether a size of a resource allocated by a base station to the receiving device exceeds a size of a time-frequency resource that can be scheduled by the base station is first determined, and then a TBS is determined in different manners based on a determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of symbol units allocated to the receiving device, and the TB is generated based on the determined TBS. The quantity of symbol units varies with a symbol length, and therefore, the determined TBS may vary with the symbol length. Such generation of the TB based on the determined TBS can avoid a waste of time-frequency resources and relatively poor error-correction performance, thereby meeting a service requirement. This is applicable to TB generation when a symbol length is changeable.

It should be noted that step 401*f* may be implemented by the processor 332 in the base station shown in FIG. 2 by executing the determining module 331*b* in the memory 331, and step 402*f* may be implemented by the processor 332 in the base station shown in FIG. 2 by executing the generation module 331*c* in the memory 331.

Figure 9A:
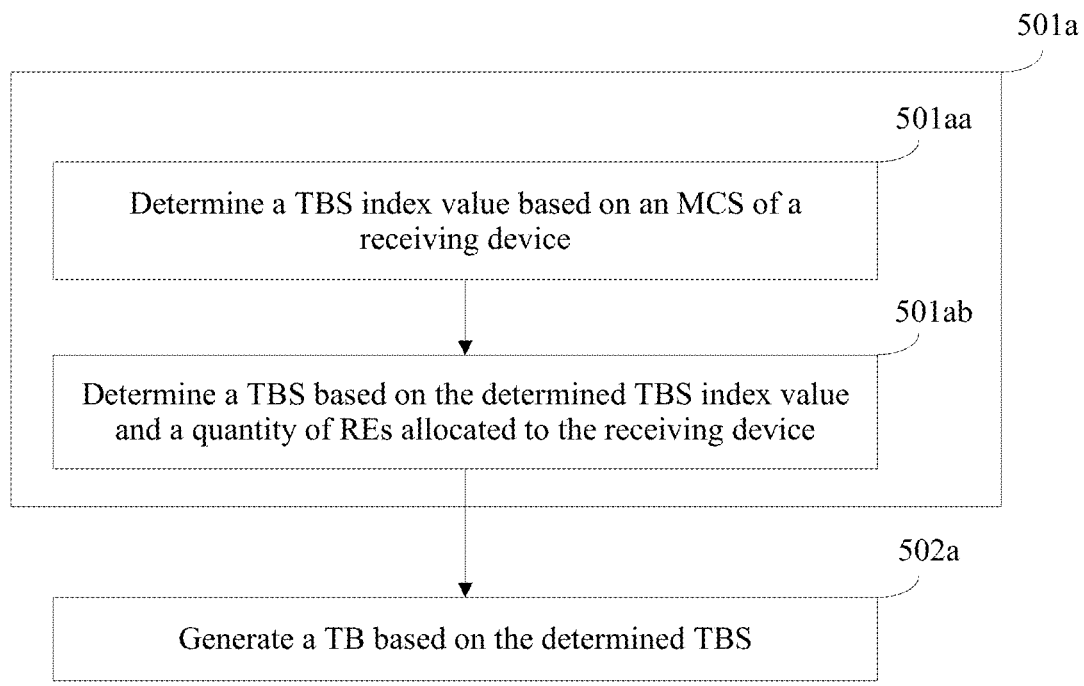
FIG. 9a is a flowchart of a TB generation method according to an embodiment of the present disclosure.

FIG. 9*a* is a flowchart of a TB generation method according to an example embodiment of this application. A difference between the embodiment shown in FIG. 9*a* and the embodiment shown in FIG. 5*a* lies in that a time-frequency resource allocated to a receiving device includes one or more REs. A quantity of REs in the time-frequency resource allocated to the receiving device varies with a TTI length. As shown in FIG. 9*a*, the method includes the following steps.

Step 501*a*: Determine a TBS based on an MCS of the receiving device and the quantity of REs allocated to the receiving device.

In actual application, determining of the MCS and allocation of the time-frequency resource may be the same as those in the embodiment shown in FIG. 5*a*. Details are not described herein again. If the time-frequency resource is allocated to the receiving device in a unit of a resource block pair, the quantity of RE is calculated by using the following formula (9):

$$N_{RE} = N_{RB} \times L_{Symbol} \qquad (9),\text{ where}$$

$N_{RE}$ represents the quantity of REs, $N_{RB}$ represents a quantity of RBs in the time-frequency resource allocated to the receiving device, and $L_{Symbol}$ represents a quantity of symbols included in the RB.

It can be learned from the formula (9) that the quantity of REs varies with the quantity of symbols included in the RB.

Specifically, step 501*a* may include the following steps:

Step 501*aa*: Determine a TBS index value based on the MCS of the receiving device.

Step 501*ab*: Determine the TBS based on the determined TBS index value and the quantity of REs allocated to the receiving device.

Specifically, step 501*aa* may be the same as step 201*aa* in the embodiment shown in FIG. 5*a*. Details are not described herein again.

Optionally, step 501*ab* may include:

searching a TBS correspondence table for the corresponding TBS based on the determined TBS index value and the quantity of REs allocated to the receiving device.

In this embodiment, the TBS correspondence table is used to indicate a correspondence between a TBS index value, a quantity of REs, and a TBS. For example, the TBS correspondence table may be shown in the following Table 9:

TABLE 9

| TBS index value | Quantity of REs | | | | | | | | | |
|---|---|---|---|---|---|---|---|---|---|---|
| | 1 | 2 | 3 | 4 | 5 | 6 | 7 | 8 | 9 | 10 |
| 0 | X | X | X | X | X | X | X | X | X | X |
| 1 | X | X | X | X | X | X | X | X | X | X |
| 2 | X | X | X | X | X | X | X | X | X | X |
| 3 | X | X | X | X | X | X | X | X | X | X |
| 4 | X | X | X | X | X | X | X | X | X | X |
| 5 | X | X | X | X | X | X | X | X | X | X |
| 6 | X | X | X | X | X | X | X | X | X | X |
| 7 | X | X | X | X | X | X | X | X | X | X |
| 8 | X | X | X | X | X | X | X | X | X | X |
| 9 | X | X | X | X | X | X | X | X | X | X |
| 10 | X | X | X | X | X | X | X | X | X | X |
| 11 | X | X | X | X | X | X | X | X | X | X |
| 12 | X | X | X | X | X | X | X | X | X | X |
| 13 | X | X | X | X | X | X | X | X | X | X |
| 14 | X | X | X | X | X | X | X | X | X | X |
| 15 | X | X | X | X | X | X | X | X | X | X |

Step 502a: Generate a TB based on the determined TBS.

Specifically, step 502a may be the same as step 202a in the embodiment shown in FIG. 5a. Details are not described herein again.

In this embodiment of the present disclosure, the TBS is determined based on the MCS of the receiving device and the quantity of REs allocated to the receiving device, and the TB is generated based on the determined TBS. The quantity of REs varies with the TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 501a may be implemented by the processor 332 in the base station shown in FIG. 2 by executing the determining module 331b in the memory 331, and step 502a may be implemented by the processor 332 in the base station shown in FIG. 2 by executing the generation module 331c in the memory 331.

Figure 9B:
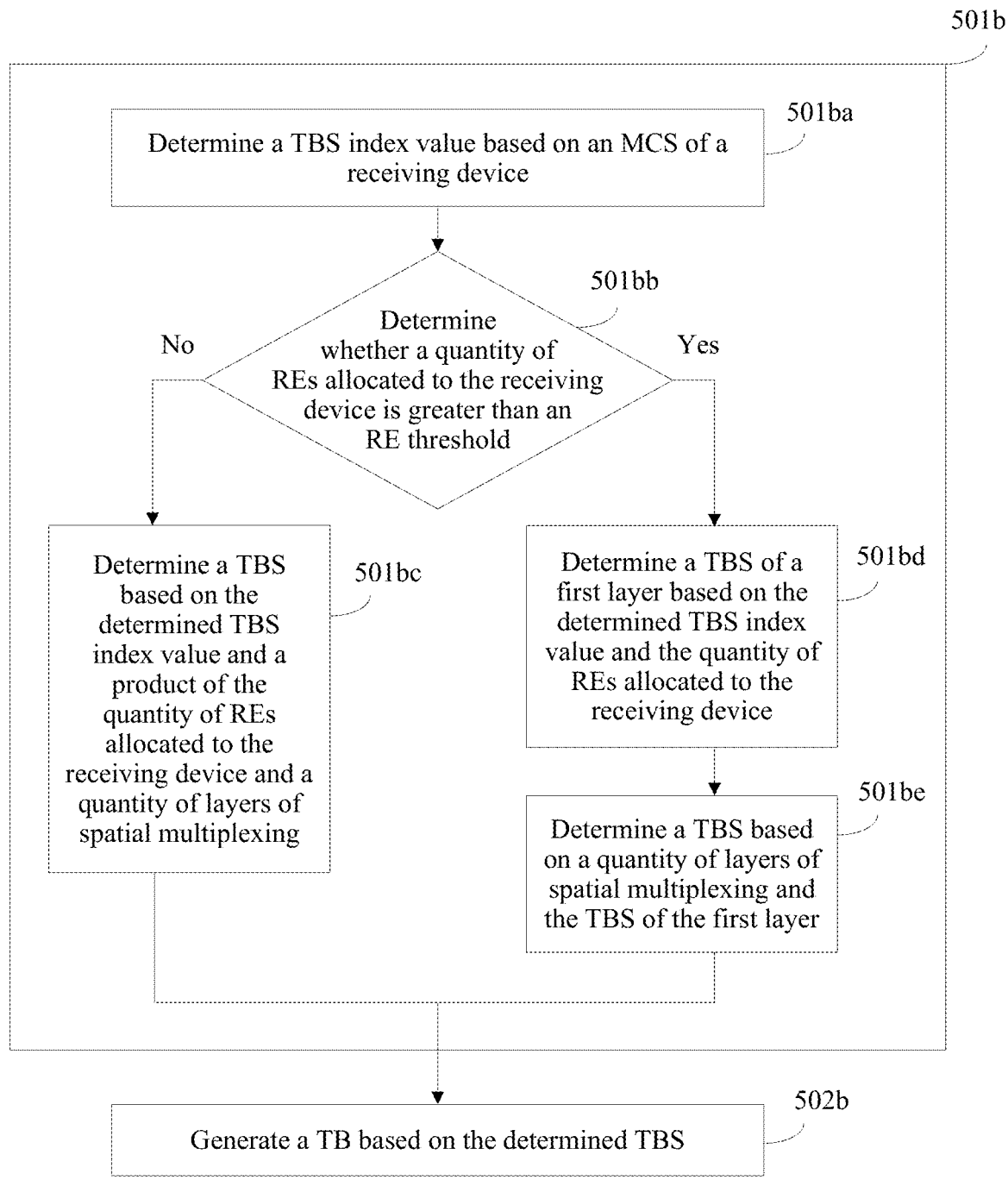
FIG. 9b is a flowchart of another TB generation method according to an embodiment of the present disclosure.

FIG. 9b is a flowchart of another TB generation method according to an example embodiment of this application. A difference between the embodiment shown in FIG. 9b and the embodiment shown in FIG. 9a lies in that data is transmitted to a receiving device by using a spatial multiplexing technology, in other words, the data transmitted to the receiving device is carried on multi-layer same time-frequency resources. As shown in FIG. 9b, the method includes the following steps.

Step 501b: Determine a TBS based on an MCS of the receiving device and a quantity of REs allocated to the receiving device.

In this embodiment, definitions and determining methods of the MCS and the RE may be the same as those in the embodiment shown in FIG. 9a. Details are not described herein again.

Specifically, step 501b may include the following steps.

Step 501ba: Determine a TBS index value based on the MCS of the receiving device.

Step 501bb: Determine whether the quantity of REs allocated to the receiving device is greater than an RE threshold. When the quantity of REs is less than or equal to the RE threshold, step 501bc is performed. When the quantity of REs is greater than the RE threshold, step 501bd and step 501be are performed.

Step 501bc: Determine the TBS based on the determined TBS index value and a product of the quantity of REs allocated to the receiving device and a quantity of layers of spatial multiplexing.

Step 501bd: Determine a TBS of a first layer based on the determined TBS index value and the quantity of REs allocated to the receiving device.

Step 501be: Determine the TBS based on a quantity of layers of spatial multiplexing and the TBS of the first layer.

As described in the embodiment shown in FIG. 5d, a TBS correspondence table is created based on a size of a time-frequency resource that can be scheduled by a base station. When the spatial multiplexing technology is used, transmitted data is carried on multi-layer same time-frequency resources, and after spatial multiplexing, a size of a time-frequency resource allocated to the receiving device may exceed the size of the time-frequency resource that can be scheduled by the base station. Therefore, when the spatial multiplexing technology is used, whether the size of the resource allocated by the base station to the receiving device exceeds the size of the time-frequency resource that can be scheduled by the base station is first determined, and then a TBS is determined in different manners based on a determining result. The RE threshold may be set based on the quantity of layers of spatial multiplexing and the size of the time-frequency resource that can be scheduled by the base station. For example, if the time-frequency resource that can be scheduled by the base station includes 100 REs, and the quantity of layers of spatial multiplexing is two, the RE threshold is 100/2=50. In addition, when the quantity of REs allocated to the receiving device is greater than the size of the time-frequency resource that can be scheduled by the base station, the base station cannot implement data transmission, the method procedure directly ends, and TBS determining and TB generation are not performed.

Specifically, step 501ba may be the same as step 201aa in the embodiment shown in FIG. 5a. Details are not described herein again. Step 501be may be the same as step 201de in the embodiment shown in FIG. 5d. Details are not described herein again.

Optionally, step 501bc may include:

searching a TBS correspondence table for the corresponding TBS based on the determined TBS index value and the product of the quantity of REs allocated to the receiving device and the quantity of layers of spatial multiplexing.

Optionally, step 501bd may include:

searching a TBS correspondence table for the corresponding TBS based on the determined TBS index value and the quantity of REs allocated to the receiving device, and using the found TBS as the TBS of the first layer.

Step 502b: Generate a TB based on the determined TBS.

Specifically, step 502b may be the same as step 202a in the embodiment shown in FIG. 5a. Details are not described herein again.

In this embodiment of the present disclosure, when data is transmitted to the receiving device by using the spatial multiplexing technology, whether the size of the resource allocated by the base station to the receiving device exceeds the size of the time-frequency resource that can be scheduled by the base station is first determined, and then the TBS is determined in different manners based on the determining result, resolving a problem that the TBS correspondence table cannot be directly used when the size of the resource allocated by the base station to the receiving device exceeds the size of the time-frequency resource that can be scheduled by the base station. In addition, the TBS is determined based on the MCS of the receiving device and the quantity of REs allocated to the receiving device, and the TB is generated based on the determined TBS. The quantity of REs varies with a TTI length, and therefore, the determined TBS may vary with the TTI length. Such generation of the TB based on the determined TBS can avoid a waste of time-frequency resources and relatively poor error-correction performance, thereby meeting a service requirement. This is applicable to TB generation when a TTI length is changeable.

It should be noted that step 501*b* may be implemented by the processor 332 in the base station shown in FIG. 2 by executing the determining module 331*b* in the memory 331, and step 502*b* may be implemented by the processor 332 in the base station shown in FIG. 2 by executing the generation module 331*c* in the memory 331.

Figure 10:
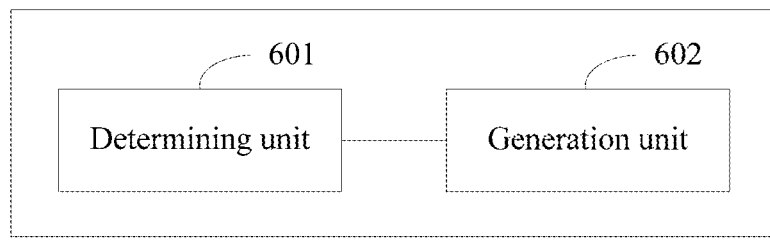
FIG. 10 is a schematic structural diagram of a TB generation apparatus according to an embodiment of the present disclosure.

FIG. 10 is a schematic structural diagram of a TB generation apparatus according to an example embodiment of this application. The apparatus may be implemented as all or a part of a base station by using software, hardware, or a combination thereof, to implement the TB generation method provided in any one of FIG. 5*a* to FIG. 5*f*, FIG. 7*a* to FIG. 7*f*, FIG. 8*a* to FIG. 8*f*, and FIG. 9*a* to FIG. 9*b*. The apparatus includes a determining unit 601 and a generation unit 602.

The determining unit 601 is configured to perform step 201*a* in the embodiment shown in FIG. 5*a*, and the generation unit 602 is configured to perform step 202*a* in the embodiment shown in FIG. 5*a*.

Alternatively, the determining unit 601 is configured to perform step 201*b* in the embodiment shown in FIG. 5*b*, and the generation unit 602 is configured to perform step 202*b* in the embodiment shown in FIG. 5*b*.

Alternatively, the determining unit 601 is configured to perform step 201*c* in the embodiment shown in FIG. 5*c*, and the generation unit 602 is configured to perform step 202*c* in the embodiment shown in FIG. 5*c*.

Alternatively, the determining unit 601 is configured to perform step 201*d* in the embodiment shown in FIG. 5*d*, and the generation unit 602 is configured to perform step 202*d* in the embodiment shown in FIG. 5*d*.

Alternatively, the determining unit 601 is configured to perform step 201*e* in the embodiment shown in FIG. 5*e*, and the generation unit 602 is configured to perform step 202*e* in the embodiment shown in FIG. 5*e*.

Alternatively, the determining unit 601 is configured to perform step 201*f* in the embodiment shown in FIG. 5*f*, and the generation unit 602 is configured to perform step 202*f* in the embodiment shown in FIG. 5*f*.

Alternatively, the determining unit 601 is configured to perform step 301*a* in the embodiment shown in FIG. 7*a*, and the generation unit 602 is configured to perform step 302*a* in the embodiment shown in FIG. 7*a*.

Alternatively, the determining unit 601 is configured to perform step 301*b* in the embodiment shown in FIG. 7*b*, and the generation unit 602 is configured to perform step 302*b* in the embodiment shown in FIG. 7*b*.

Alternatively, the determining unit 601 is configured to perform step 301*c* in the embodiment shown in FIG. 7*c*, and the generation unit 602 is configured to perform step 302*c* in the embodiment shown in FIG. 7*c*.

Alternatively, the determining unit 601 is configured to perform step 301*d* in the embodiment shown in FIG. 7*d*, and the generation unit 602 is configured to perform step 302*d* in the embodiment shown in FIG. 7*d*.

Alternatively, the determining unit 601 is configured to perform step 301*e* in the embodiment shown in FIG. 7*e*, and the generation unit 602 is configured to perform step 302*e* in the embodiment shown in FIG. 7*e*.

Alternatively, the determining unit 601 is configured to perform step 301*f* in the embodiment shown in FIG. 7*f*, and the generation unit 602 is configured to perform step 302*f* in the embodiment shown in FIG. 7*f*.

Alternatively, the determining unit 601 is configured to perform step 401*a* in the embodiment shown in FIG. 8*a*, and the generation unit 602 is configured to perform step 402*a* in the embodiment shown in FIG. 8*a*.

Alternatively, the determining unit 601 is configured to perform step 401*b* in the embodiment shown in FIG. 8*b*, and the generation unit 602 is configured to perform step 402*b* in the embodiment shown in FIG. 8*b*.

Alternatively, the determining unit 601 is configured to perform step 401*c* in the embodiment shown in FIG. 8*c*, and the generation unit 602 is configured to perform step 402*c* in the embodiment shown in FIG. 8*c*.

Alternatively, the determining unit 601 is configured to perform step 401*d* in the embodiment shown in FIG. 8*d*, and the generation unit 602 is configured to perform step 402*d* in the embodiment shown in FIG. 8*d*.

Alternatively, the determining unit 601 is configured to perform step 401*e* in the embodiment shown in FIG. 8*e*, and the generation unit 602 is configured to perform step 402*e* in the embodiment shown in FIG. 8*e*.

Alternatively, the determining unit 601 is configured to perform step 401*f* in the embodiment shown in FIG. 8*f*, and the generation unit 602 is configured to perform step 402*f* in the embodiment shown in FIG. 8*f*.

Alternatively, the determining unit 601 is configured to perform step 501*a* in the embodiment shown in FIG. 9*a*, and the generation unit 602 is configured to perform step 502*a* in the embodiment shown in FIG. 9*a*.

Alternatively, the determining unit 601 is configured to perform step 501*b* in the embodiment shown in FIG. 9*b*, and the generation unit 602 is configured to perform step 502*b* in the embodiment shown in FIG. 9*b*.

Because the TB generation apparatus provided in this embodiment of the present disclosure has same technical characteristics as the TB generation method provided in any one of the foregoing embodiments, a same technical problem can also be resolved, and a same technical effect is achieved.

It should be noted that when the TB generation apparatus provided in the foregoing embodiment generates a TB, division of the foregoing function modules is used only as an example for description. In actual application, the foregoing functions may be allocated to different function modules and implemented based on a requirement, in other words, an internal structure of the apparatus is divided into different function modules for implementing all or some of the functions described above. In addition, the TB generation apparatus provided in the foregoing embodiment and the embodiments of the TB generation method pertain to a same concept. For a specific implementation process, refer to the method embodiments. Details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A transport block generation method, comprising:
   determining a transport block (TB) size (TBS) based on a modulation and coding scheme (MCS) of a receiving device, a resource characteristic of a resource block (RB) allocated to the receiving device, and a quantity of symbols, wherein the quantity of symbols is a quantity of symbols comprised in each RB, and each RB comprises a same quantity of symbols; and
   generating a TB based on the TBS.

2. The method according to claim 1, wherein determining a TBS based on an MCS of a receiving device, a resource characteristic of an RB allocated to the receiving device, and a quantity of symbols comprises:
   determining a TBS index value based on the MCS; and
   determining the TBS based on the TBS index value, the resource characteristic of the RB, and the quantity of symbols.

3. The method according to claim 2, wherein the resource characteristic of the RB is a quantity of RBs.

4. The method according to claim 2, wherein the resource characteristic of the RB is a quantity of equivalent RBs associated with resource utilization of the RB, and the resource utilization of the RB is a ratio of a quantity of resource elements REs occupied by data in the RB to a quantity of REs occupied by the RB.

5. The method according to claim 4, wherein determining the TBS based on the TBS index value, the resource characteristic of the RB, and the quantity of symbols comprises:
   determining the quantity of equivalent RBs based on a ratio of a size of data transmitted by each RB in a resource mapping mode to a size of data transmitted in a resource mapping mode that is used as a reference; and
   determining the TBS based on the TBS index value, the quantity of equivalent RBs, and the quantity of symbols.

6. The method according to claim 4, wherein determining the TBS based on the TBS index value, the resource characteristic of the RB, and the quantity of symbols comprises:
   determining the quantity of equivalent RBs based on a ratio of a size of data transmitted by all RBs in resource mapping modes to a size of data transmitted in a resource mapping mode that is used as a reference; and
   determining the TBS based on the TBS index value, the quantity of equivalent RBs, and the quantity of symbols.

7. The method according to claim 2, wherein the resource characteristic of the RB is a product of a quantity of RBs and a quantity of layers of spatial multiplexing.

8. The method according to claim 7, wherein determining the TBS based on the TBS index value, the resource characteristic of the RB, and the quantity of symbols comprises:
   determining whether the quantity of RBs is greater than an RB threshold;
   when the quantity of RBs is less than or equal to the RB threshold, determining the TBS based on the TBS index value, the product of the quantity of RBs and the quantity of layers of spatial multiplexing, and the quantity of symbols; and
   when the quantity of RBs is greater than the RB threshold, determining a TBS of a first layer based on the TBS index value, the resource characteristic of the RB, and the quantity of symbols, and determining the TBS based on the quantity of layers of spatial multiplexing and the TBS of the first layer.

9. A transport block generation apparatus, comprising:
   memory; and
   a processor configured to:
      determine a transport block (TB) size (TBS) based on a modulation and coding scheme (MCS) of a receiving device, a resource characteristic of a resource block (RB) allocated to the receiving device, and a quantity of symbols, wherein the quantity of symbols is a quantity of symbols comprised in each RB, and each RB comprises a same quantity of symbols, and
      generate a TB based on the TBS.

10. The apparatus according to claim 9, wherein the processor is configured to:
    determine a TBS index value based on the MCS; and
    determine the TBS based on the TBS index value, the resource characteristic of the RB, and the quantity of symbols.

11. The apparatus according to claim 10, wherein the resource characteristic of the RB is a quantity of RBs.

12. The apparatus according to claim 10, wherein the resource characteristic of the RB is a quantity of equivalent RBs, the quantity of equivalent RBs is associated with resource utilization of the RB, and the resource utilization of the RB is a ratio of a quantity of resource elements REs occupied by data in the RB to a quantity of REs occupied by the RB.

13. The apparatus according to claim 12, wherein the processor is configured to:
    determine the quantity of equivalent RBs based on a ratio of a size of data transmitted by each RB in a resource mapping mode to a size of data transmitted in a resource mapping mode that is used as a reference; and
    determine the TBS based on the TBS index value, the quantity of equivalent RBs, and the quantity of symbols.

14. The apparatus according to claim 12, wherein the processor is configured to:
    determine the quantity of equivalent RBs based on a ratio of a size of data transmitted by all RBs in resource mapping modes to a size of data transmitted in a resource mapping mode that is used as a reference; and
    determine the TBS based on the TBS index value, the quantity of equivalent RBs, and the quantity of symbols.

15. The apparatus according to claim 10, wherein the resource characteristic of the RB is a product of a quantity of RBs and a quantity of layers of spatial multiplexing.

16. The apparatus according to claim 15, wherein the processor is configured to:
    determine whether the quantity of RBs is greater than an RB threshold;
    when the quantity of RBs is less than or equal to the RB threshold, determine the TBS based on the TBS index value, the product of the quantity of RBs and the quantity of layers of spatial multiplexing, and the quantity of symbols; and
    when the quantity of RBs is greater than the RB threshold, determine a TBS of a first layer based on the TBS index value, the resource characteristic of the RB, and the quantity of symbols, and determine the TBS based on the quantity of layers of spatial multiplexing and the TBS of the first layer.

* * * * *